(12) United States Patent
Juengel et al.

(10) Patent No.: US 12,704,145 B2
(45) Date of Patent: Aug. 11, 2026

(54) FASTENING SYSTEM WITH SEALING ARRANGEMENT

(71) Applicant: Acument Intellectual Properties, LLC, Sterling Heights, MI (US)

(72) Inventors: Max Juengel, Cumberland Furnace, TN (US); Jeramiah Slater, Grand Blanc, MI (US); Gary Sifferman, Grand Blanc, MI (US)

(73) Assignee: Acument Intellectual Properties, LLC, Sterling Heights, MI (US)

( * ) Notice: Subject to any disclaimer, the term of this patent is extended or adjusted under 35 U.S.C. 154(b) by 358 days.

(21) Appl. No.: 18/311,591

(22) Filed: May 3, 2023

(65) Prior Publication Data

US 2024/0369091 A1 Nov. 7, 2024

(51) Int. Cl.

*F16B 35/06* (2006.01)
*F16B 29/00* (2006.01)
*F16B 43/00* (2006.01)
*F16B 39/282* (2006.01)

(52) U.S. Cl.

CPC .............. *F16B 35/06* (2013.01); *F16B 29/00* (2013.01); *F16B 43/001* (2013.01); *F16B 39/282* (2013.01)

(58) Field of Classification Search

CPC .. F16B 39/282; F16B 33/004; F16B 2200/93; F16B 35/06

USPC .................................................. 411/187, 188

See application file for complete search history.

(56) References Cited

U.S. PATENT DOCUMENTS 2,096,041 A * 10/1937 Hosking ............... F16B 39/282 411/959
2,982,166 A * 5/1961 Hobbs ................. F16B 25/0015 411/959
4,223,711 A * 9/1980 Tabor .................... F16B 39/282 411/188
4,842,463 A * 6/1989 Landt .................... F16B 39/282 411/959
8,858,142 B2 * 10/2014 Suzuki .................... F16B 33/02 411/184
11,174,892 B2 * 11/2021 Chen ....................... F16B 35/06
11,913,487 B2 * 2/2024 Dapoz ................... F16B 33/004

* cited by examiner

*Primary Examiner* — Flemming Saether
(74) *Attorney, Agent, or Firm* — Quinn IP Law

(57) ABSTRACT

A deformable fastening system includes a clamped component and a fastener including a bolt having a shaft portion extending along a longitudinal axis of the fastener and a head portion having a surface including at least one engagement portion and one or more projections formed on the at least one engagement portion. The one or more projections are formed on the at least one engagement portion generally proximate the shaft portion. The one or more projections formed on the at least one engagement portion engage a mating surface of the clamped component to clamp the clamped component when the bolt is moved into a nut member causing an increase in axial load during the tightening cycle to deform the clamped component.

22 Claims, 14 Drawing Sheets

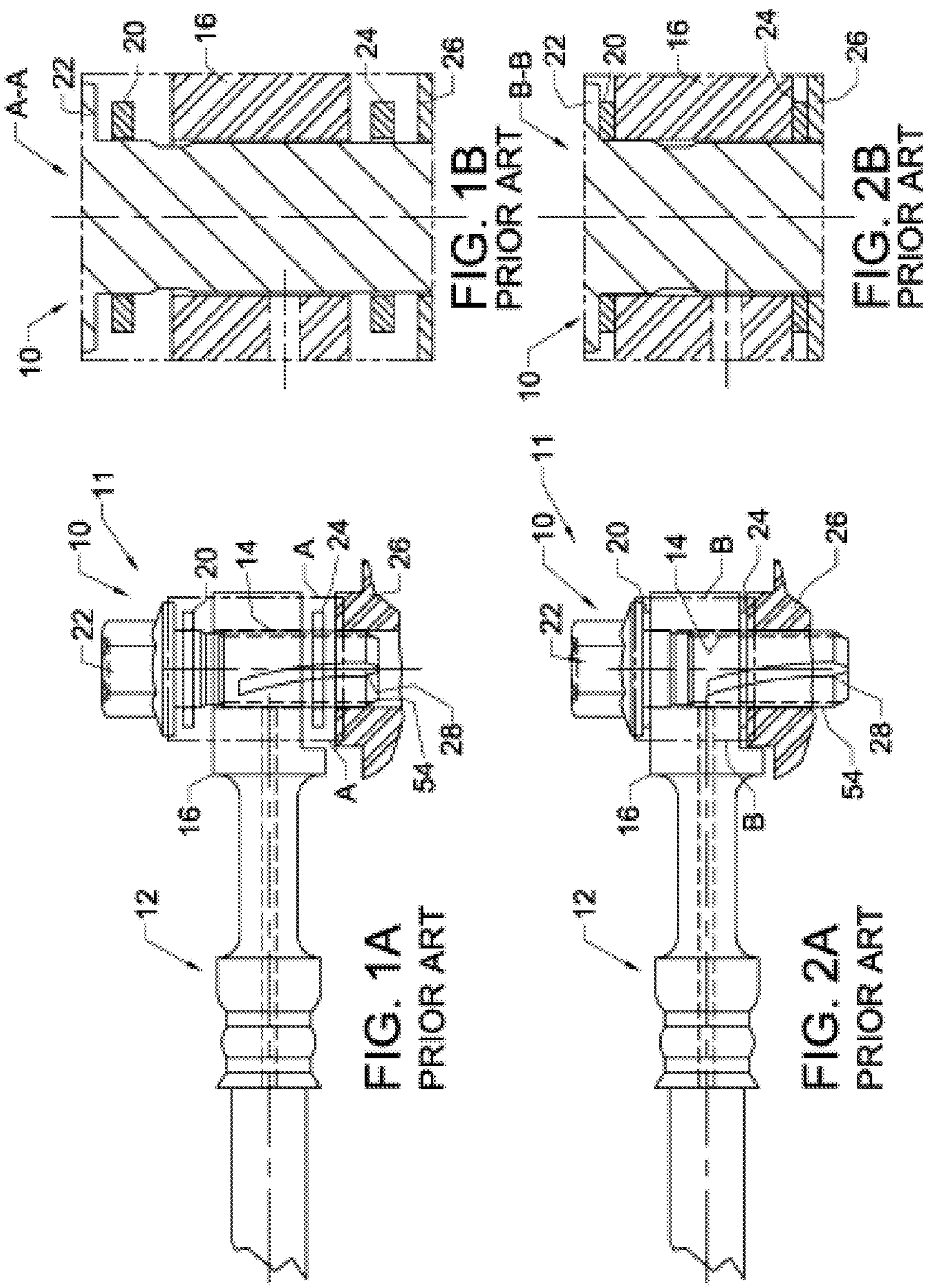
FIG. 1A
PRIOR ART
FIG. 1B
PRIOR ART
FIG. 2A
PRIOR ART
FIG. 2B
PRIOR ART
A-A
B-B
10
11
12
14
16
20
22
24
26
28
54
A
B

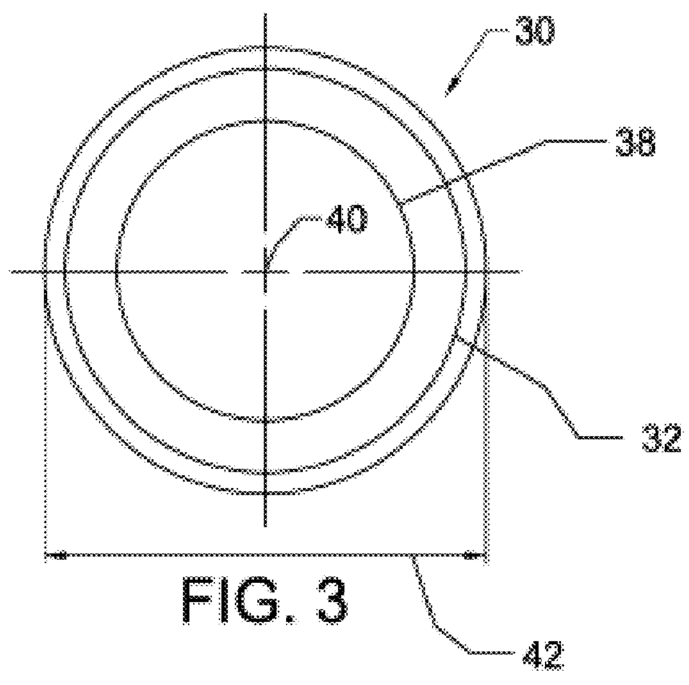
FIG. 3
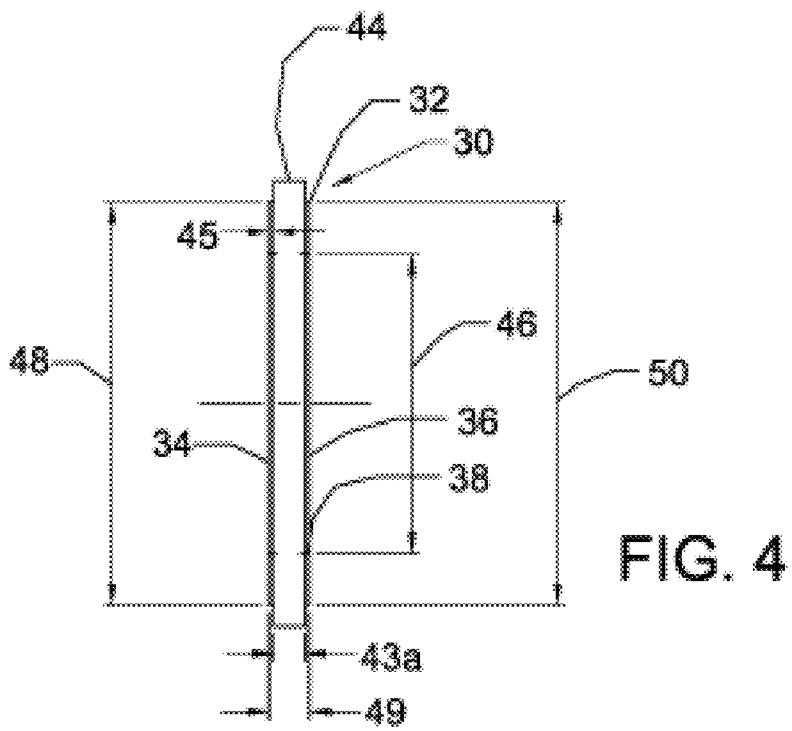
FIG. 4

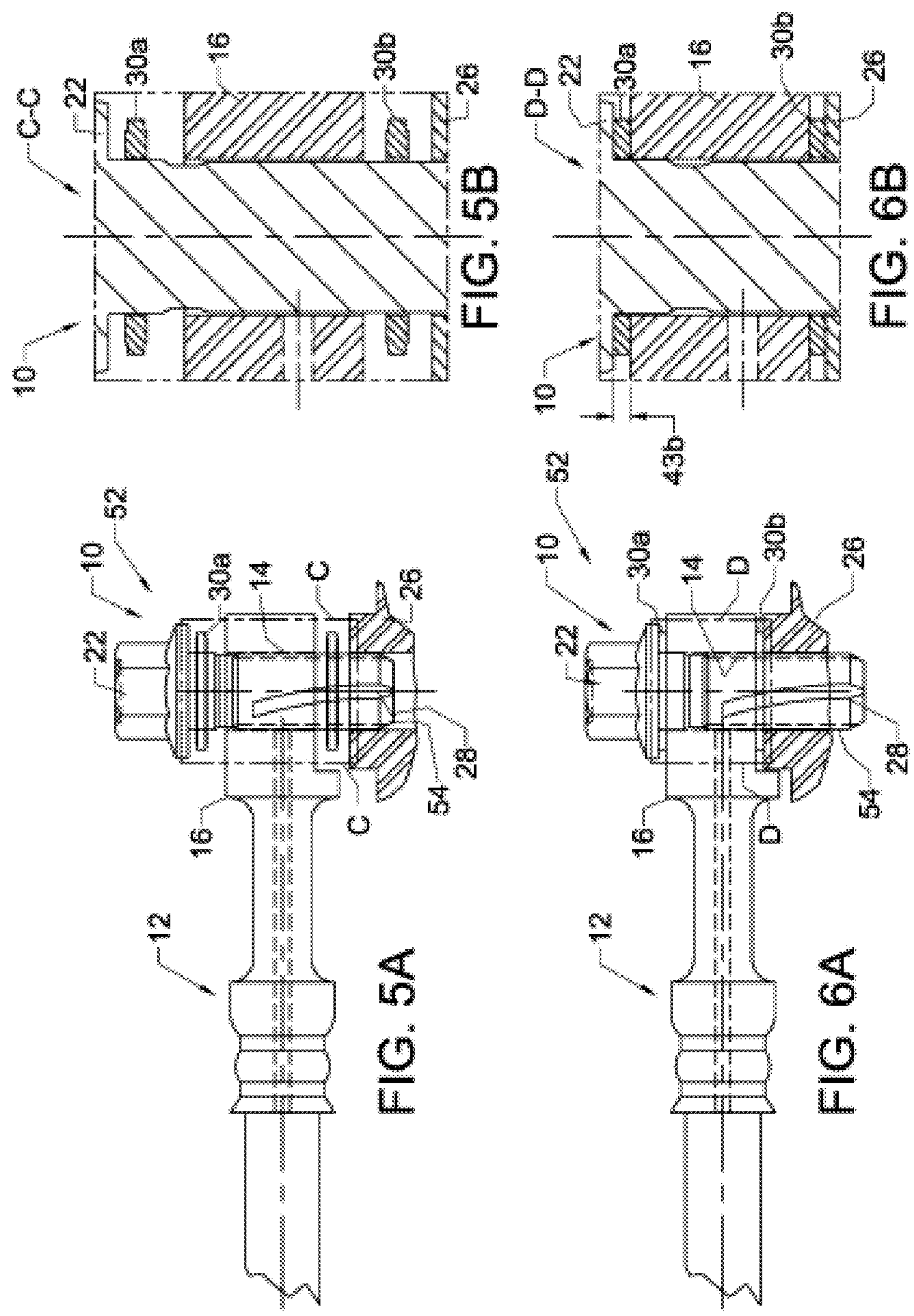
C-C
10
22
30a
16
30b
26
FIG. 5B
D-D
22
30a
16
30b
26
10
43b
FIG. 6B
52
10
22
30a
14
C
26
28
54
C
16
12
FIG. 5A
52
10
30a
14
D
30b
26
22
28
54
D
16
12
FIG. 6A

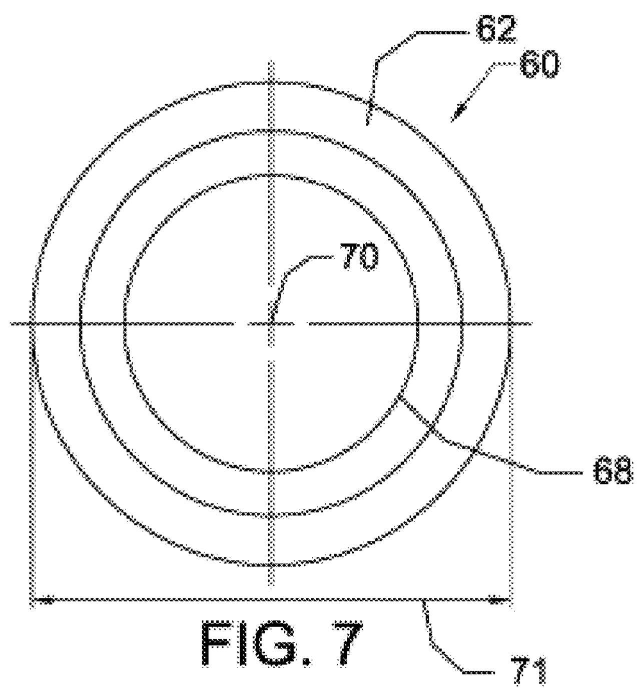
FIG. 7
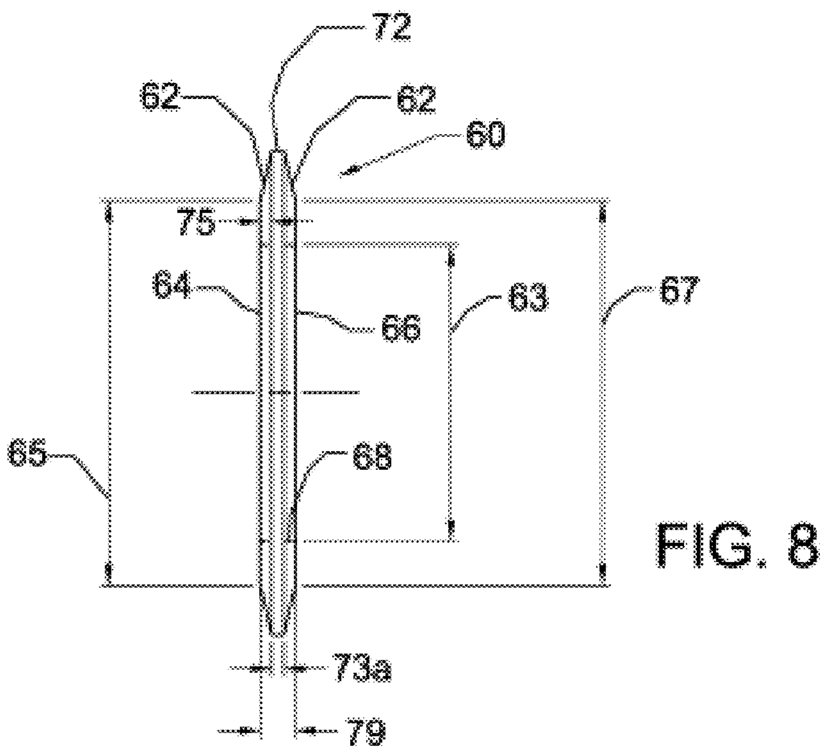
FIG. 8

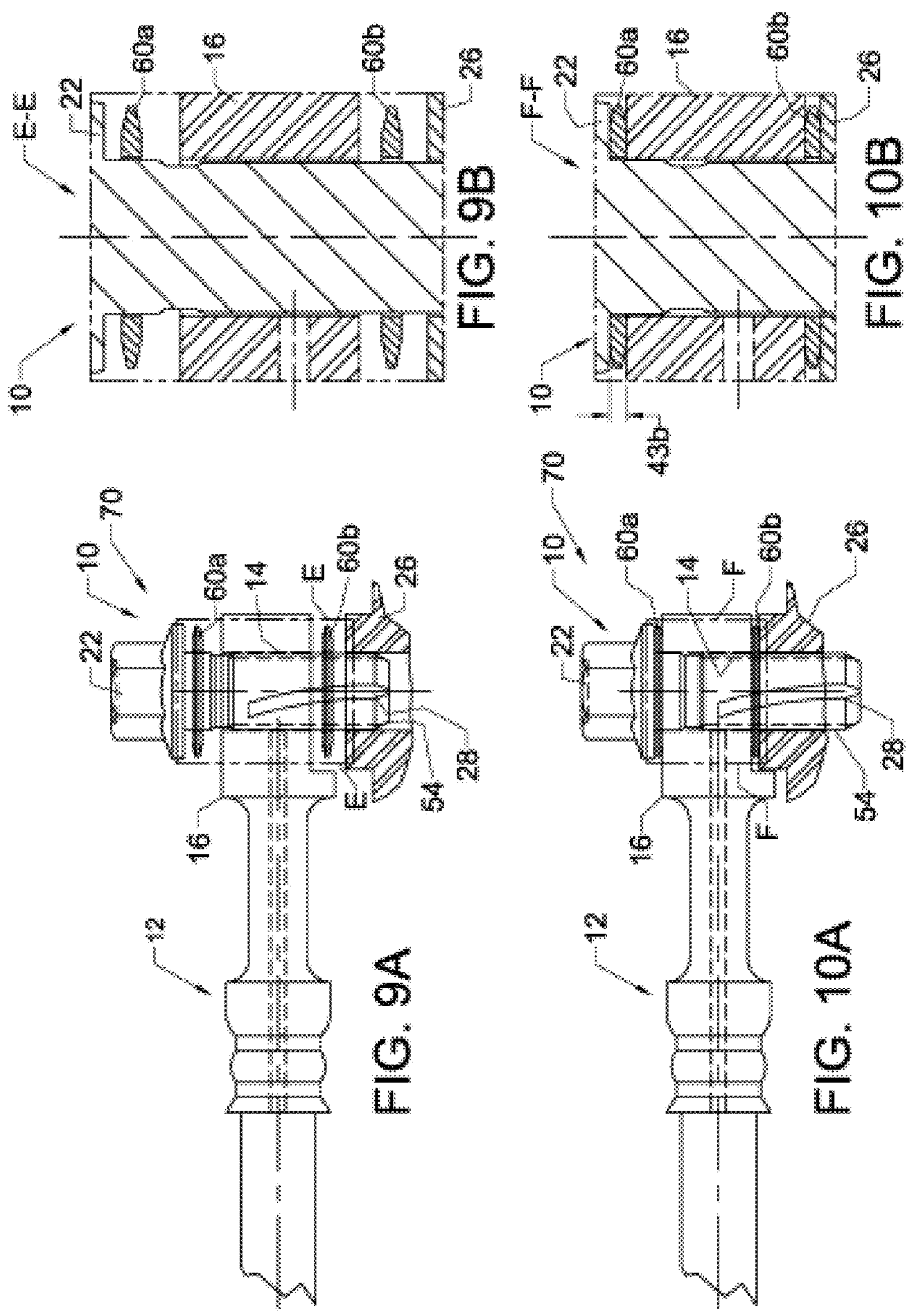
FIG. 9B
FIG. 10B
FIG. 9A
FIG. 10A

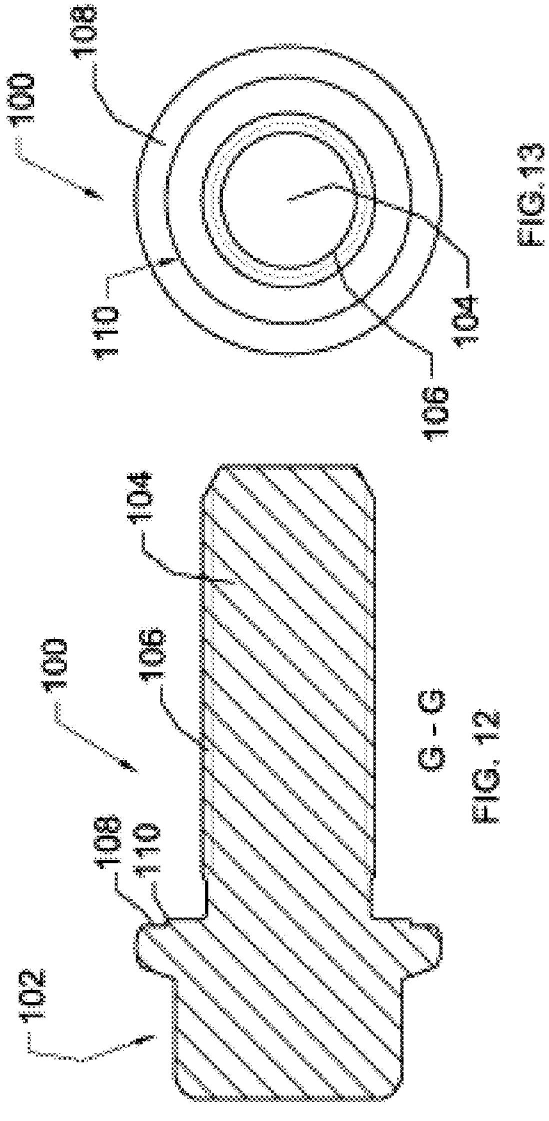
100
108
110
104
106
FIG. 13
100
104
106
108
110
102
G - G
FIG. 12
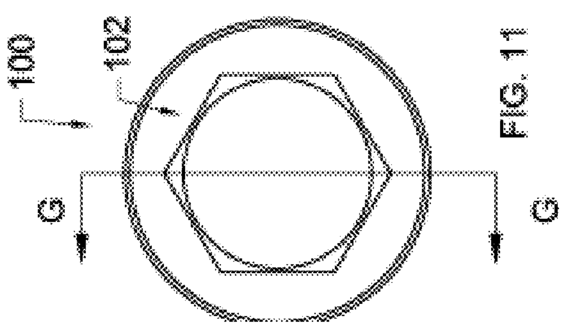
100
102
G
G
FIG. 11

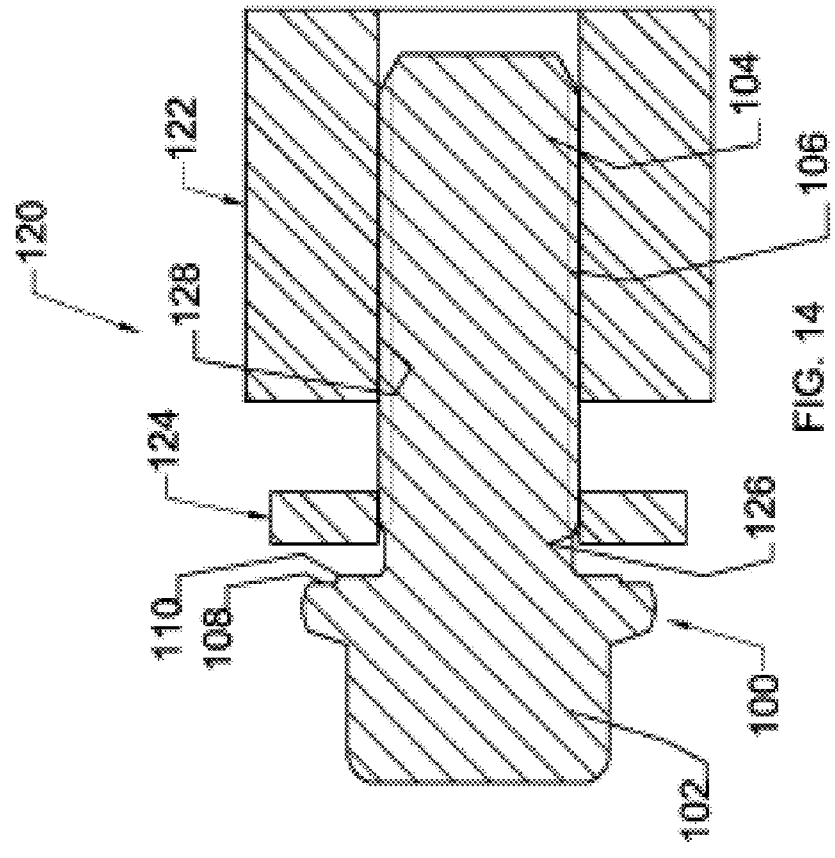
FIG. 14

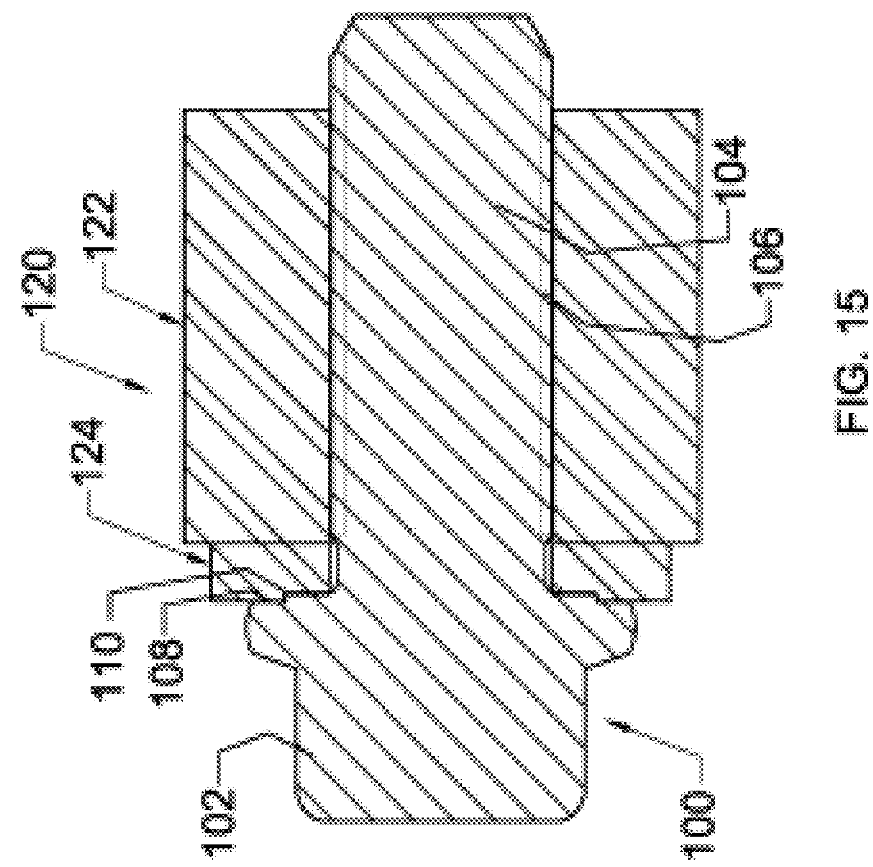
FIG. 15

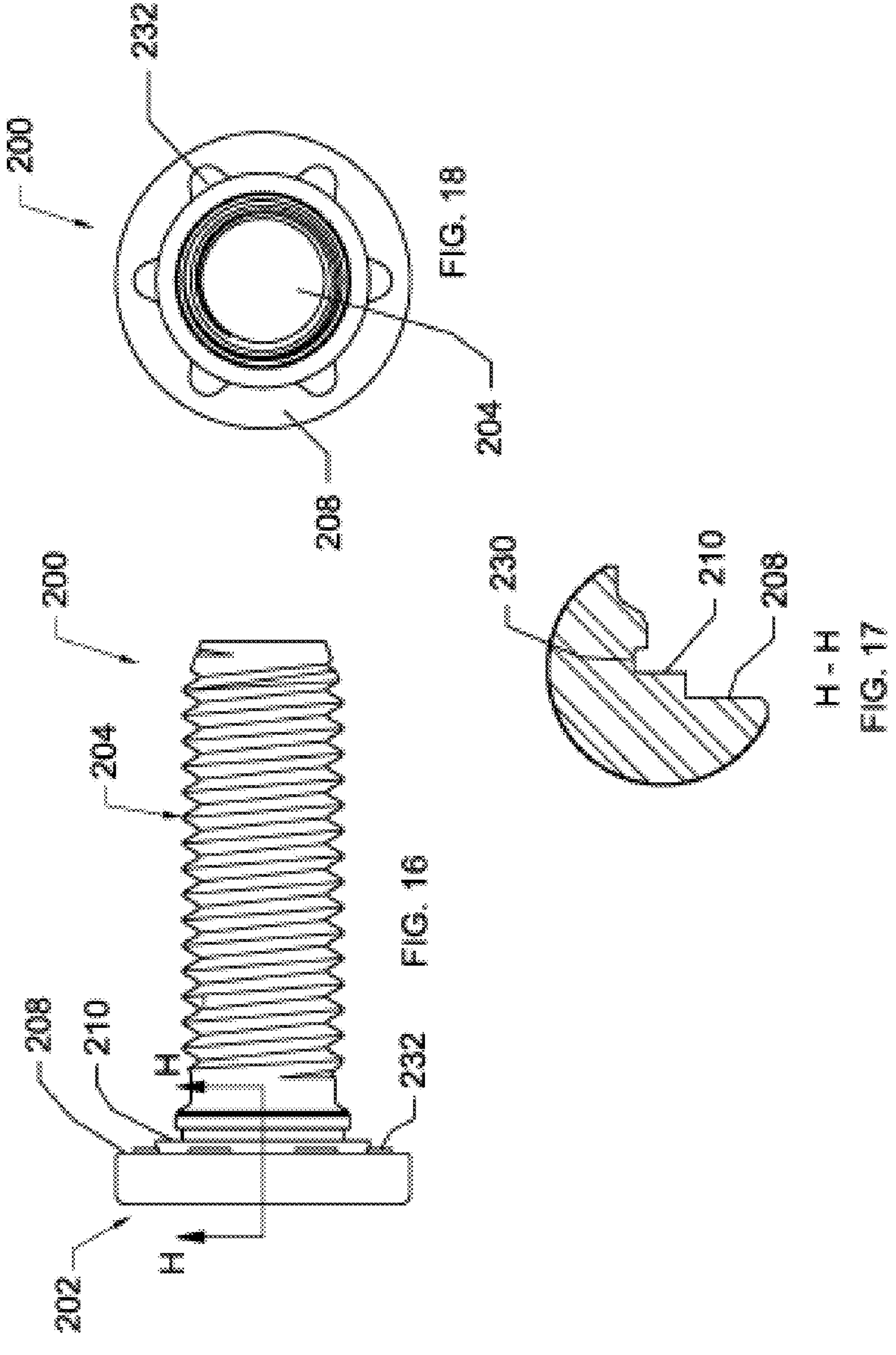
200
232
204
208
FIG. 18
200
204
230
210
208
H - H
FIG. 17
208
210
H
232
FIG. 16
H
202

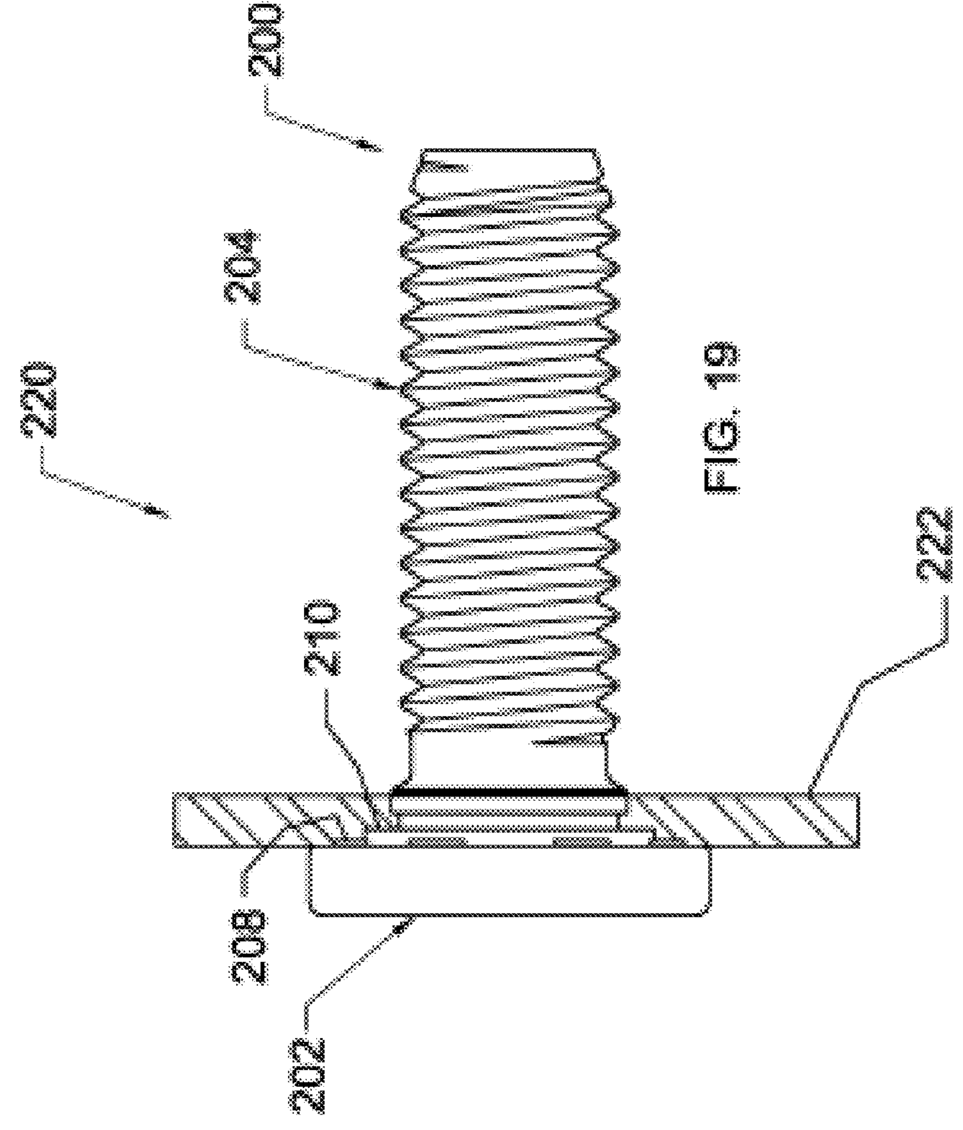
FIG. 19

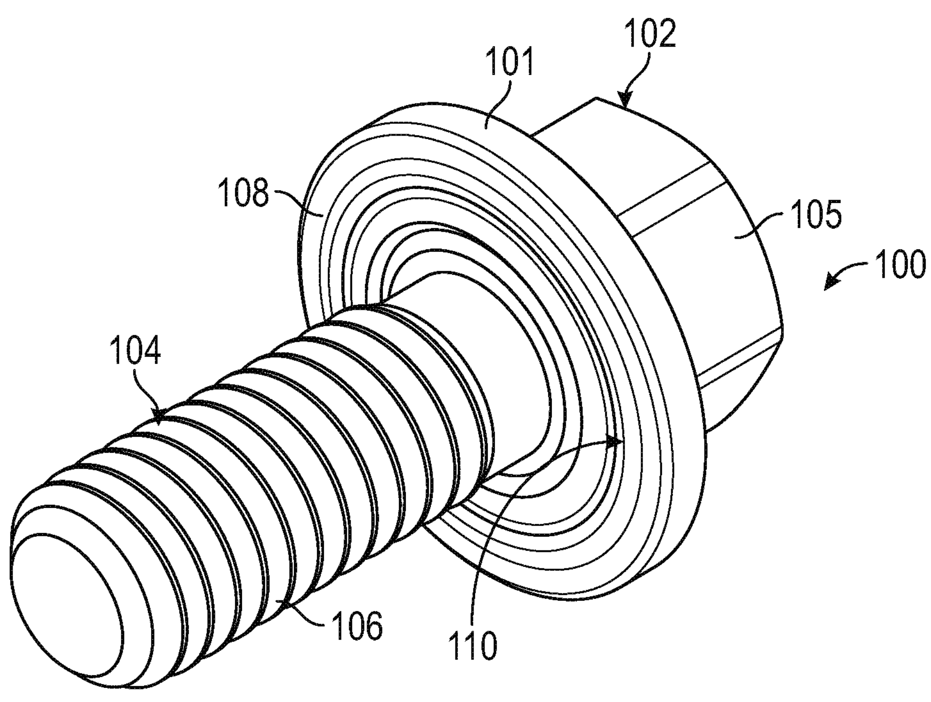
FIG. 20
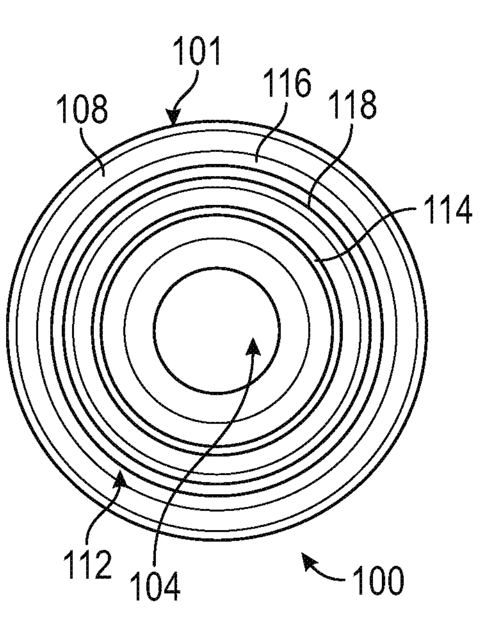
FIG. 21
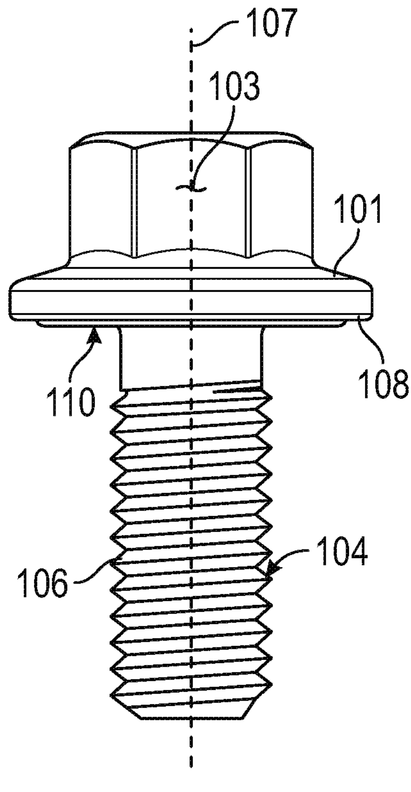
FIG. 22

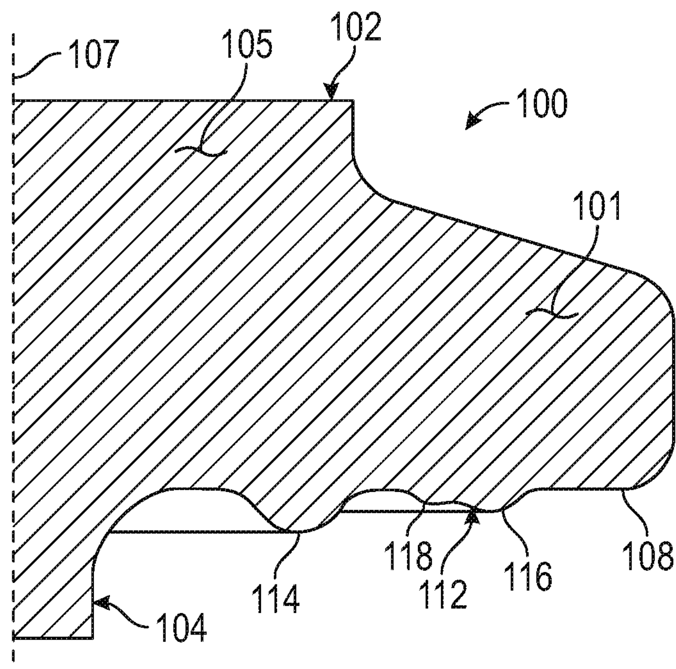
FIG. 23
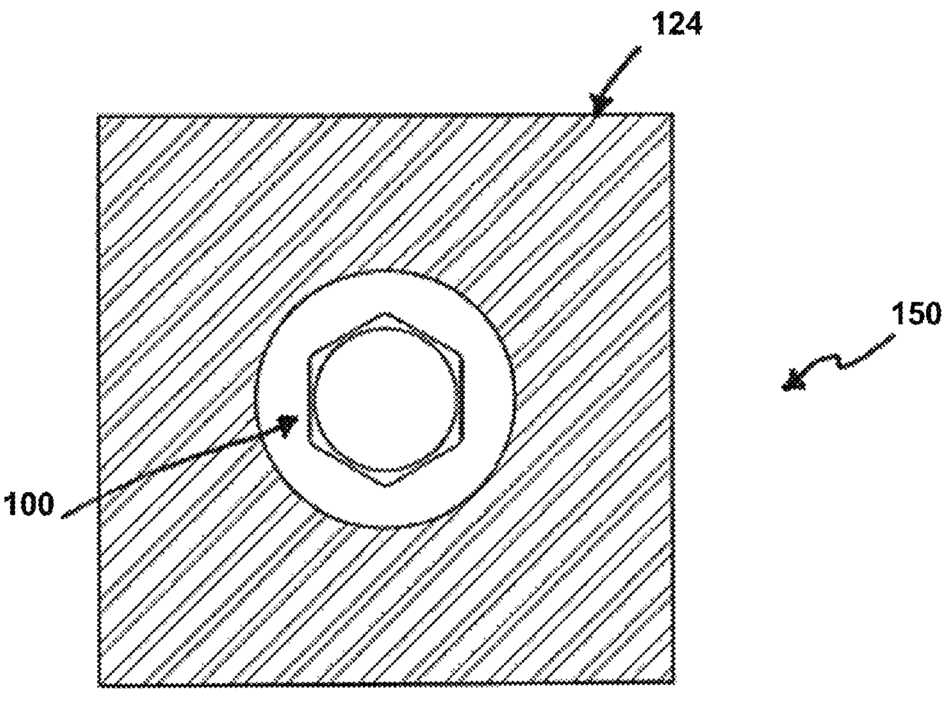
FIG. 24

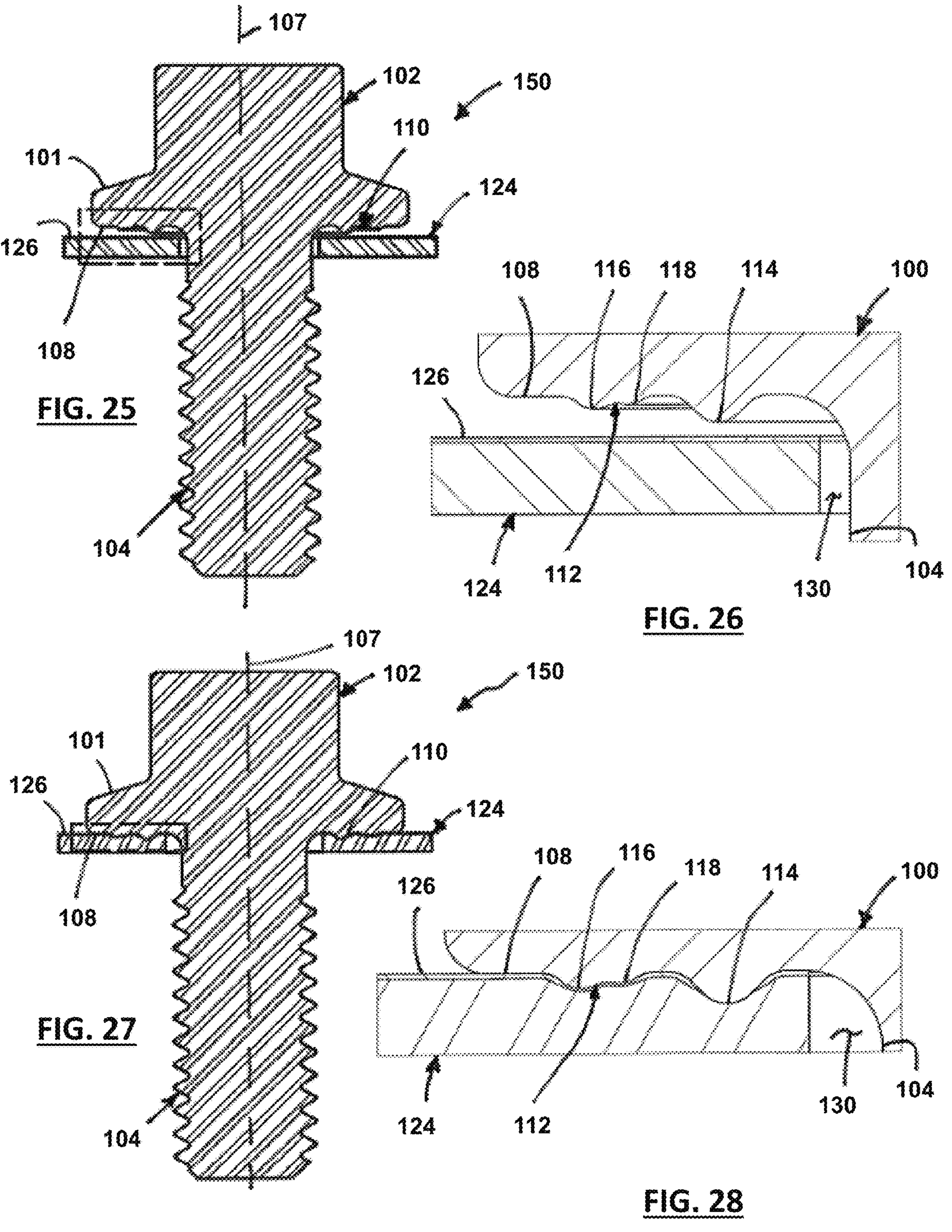
107
102
150
110
101
124
126
108
FIG. 25
104
108
116
118
114
100
126
124
112
130
104
FIG. 26
107
102
150
101
110
126
124
108
FIG. 27
104
108
116
118
114
100
126
124
112
130
104
FIG. 28

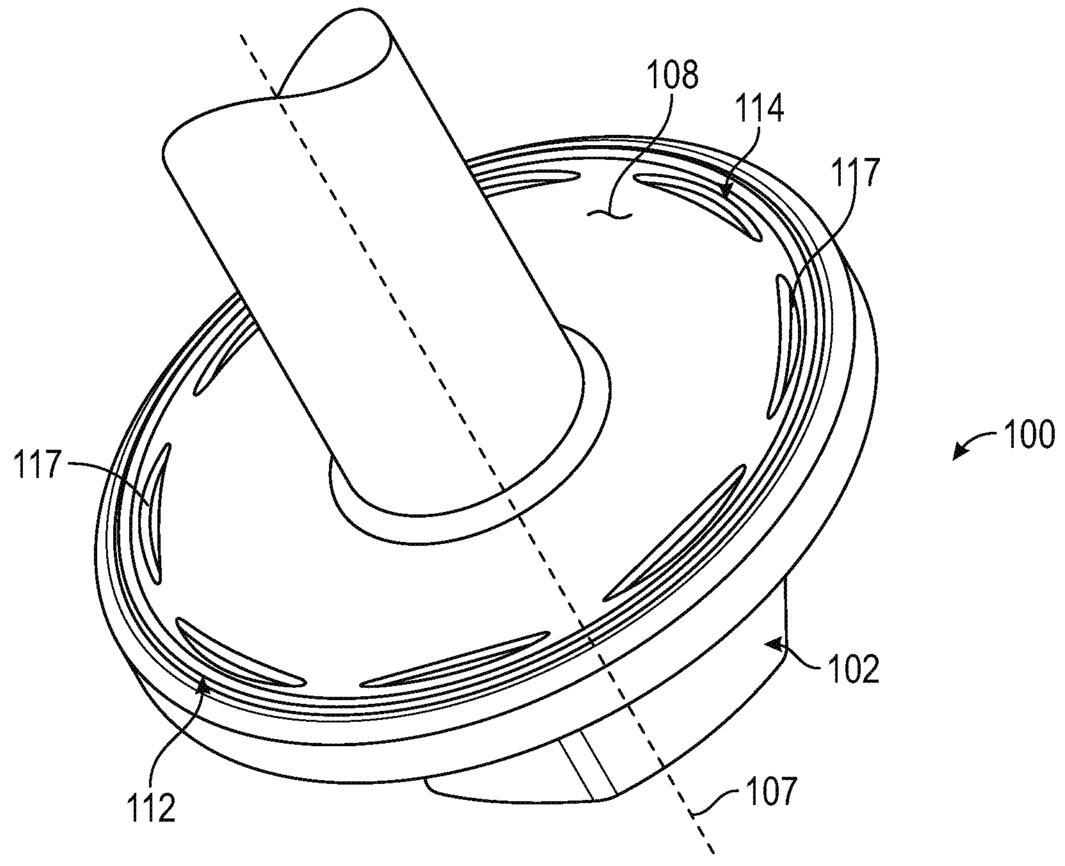
FIG. 29

FASTENING SYSTEM WITH SEALING ARRANGEMENT

CROSS REFERENCE TO RELATED APPLICATIONS

This application is a continuation-in-part of U.S. application Ser. No. 16/460,559, filed on Jul. 2, 2019, and U.S. Provisional Application Ser. No. 63/423,987, filed on Nov. 9, 2022, wherein both applications are hereby incorporated herein by reference in their entirety.

BACKGROUND

The present invention generally relates to systems for reducing the clamp force required to effectively install bolts, such as flow bolts and fastening systems with an improved sealing arrangement.

Fasteners such as threaded screws and rivets may be employed to mechanically couple components at junctions. A fastener exerts a compressive or clamping load on the joined components using complementary matched threads in the case of a screw, or a deformed end in the case of a rivet, with a corresponding tensile load being exerted upon the fastener.

When two or more materials are assembled together using one or more fasteners, the fasteners that clamp the materials together provide a clamp load or clamp force. While the clamp force needs to be significant enough to adequately secure the materials together, the clamp force should not be so great as to compromise the materials being secured.

In an attempt to apply just the right amount of clamp force, torque wrenches are often used to tighten the fasteners. Torque wrenches include a dial that provides a visual indication regarding the amount of torque being applied. Other clamp load indicating devices, such as encapsulated liquids, are sometimes used in the industry to prevent the application of too much clamp force.

Some applications require flow bolts. Flow bolts are bolts which are specifically configured to provide a seal at one or more points, yet allow fluid flow either along a through hole formed through the shaft of the bolt or along a fluid flow path provided along the shaft of the bolt. For example, some flow bolts have one or more external flutes cut or otherwise formed across the threads. As a result of the flow bolt having one or more external flutes formed across the threads, the flow bolt can generally handle less clamp force before the threads of either the bolt or a nut member become stripped. More specifically, the threads on the flow bolt and/or a nut member are susceptible to becoming stripped while the fastener is being tightened in an attempt to achieve sufficient axial force to obtain a proper seal. Even standard flow bolts which do not have one or more external flutes cut or otherwise formed across the threads require a reduced clamp load due to the lower cross-sectional area of the bolt.

As shown in FIGS. 1A, and 1B, one typical application in which a flow bolt 10 is used is in connection with a brake hose 12 for a motor vehicle. More specifically, the flow bolt 10 is inserted through a bore 14 in a connector 16 at the end of the brake hose 12 such that one metal washer 20 is positioned between the head 22 of the flow bolt 10 and the connector 16 at the end of the brake hose 12, and another metal washer 24 is positioned between the connector 16 and a securing member 26, such as a nut member, on the flow bolt 10. Then, the flow bolt 10 is tightened, causing both washers 20, 24 to compress thereby forming a seal between the connector 16 and each of the washers 20, 24, as shown in FIGS. 2A and 2B. Because the washers 20, 24 must compress during installation of the flow bolt 10, copper is typically chosen as the material for the washers. Also, because the washers effectively compress or crush during installation, the washers used in such an application are often called “crush washers.”

In order to form proper seals between the copper washers 20, 24 and the connector 16 at the end of the brake hose 12, sufficient axial force must be applied to the flow bolt 10. In other words, the flow bolt 10 and nut member 26 must be tightened sufficiently such that the copper washers 20, 24 become pressed into the connector 16 hard enough to form a seal. However, threads on the flow bolt 10 and/or the nut member 26 can become stripped while achieving an axial force that is sufficient to form this seal, especially if the bolt includes one or more external flutes 28 across the threads.

SUMMARY

An object of an embodiment of the present invention is to provide a deformable fastening system that requires a reduced clamp load to seal the deformable fastening system than is required to seal a conventional fastening system.

An object of an embodiment of the present invention is to provide a system that reduces the axial force that is required to install a fastening member.

Another object of an embodiment of the present invention is to provide a system that controls the amount of axial force that is required to obtain a desired clamp load when a fastener, such as a washer and bolt combination, a bolt or a flow bolt is installed.

Another object of an embodiment of the invention is to provide a reduction in clamp force range for a given torque, thereby requiring less axial force needed to properly install the fastener.

Yet another object of an embodiment of the present invention is to provide a system that reduces the clamp load required to obtain a seal when a flow bolt is installed, where the reduction in the clamp load is equal to or greater than the reduction in clamp load that can be accommodated due to either one or more external flutes being provided across the threads of the bolt or simply because the bolt is a flow bolt and is provided as having a reduced cross-section.

Still yet another object of an embodiment of the present invention is to provide a system that reduces the crush area of a deformable member.

Still yet another object of an embodiment of the present invention is to provide a system that provides a deformable fastening system that includes a sealing clinch feature.

In an embodiment of the present invention, a deformable fastening system comprises a deformable member; and a mating member that seals with the deformable member, wherein the deformable member requires a reduced clamp load to seal with the mating member than a clamp load required to seal a non-deformable member with a conventional mating member in a conventional fastening system.

In an embodiment of the present invention, the deformable member comprises: a fastener including at least one step having an inner portion having a first side and a second side opposing the first side, wherein the inner portion is bounded by an inner maximum dimension and at least one first outer portion integrally formed with and protruding outwardly from the inner portion first side defining a first outer surface bounded by a first outer maximum dimension less than the inner maximum dimension In an embodiment of the present invention, the first axial force applied to the fastening member to reach the required axial force is less than a second axial force applied to a conventional fastener to seal the conventional fastening system.

In another embodiment of the present invention, the at least one outer portion has either a rectangular side profile or a first tapered portion defining a first tapered profile and a first planar portion defining the first outer portion.

In an embodiment of the present invention, the deformable member is a washer having a uniform middle portion defining the inner portion.

In an embodiment of the present invention, the washer either has at least one rectangular step or a taper on each side of the inner portion of the washer. The at least one rectangular step or taper on the washer reduces the effective contact surface area when compared to a conventional shape. A conventional washer is circular, has a hole in the middle, and is flat on both the top and the bottom. Unlike a conventional washer, a washer in accordance with an embodiment of the present invention provides either a stepped or tapered configuration, wherein both the top and the bottom of the washer are either stepped or tapered, thereby providing for a reduced contact surface area which effectively translates into less axial force being needed to properly install the fastener.

In an embodiment of the present invention, the washer has at least one second outer portion integrally formed with the uniform middle portion that protrudes outwardly from the uniform middle portion second side defining a second outer surface bounded by a second outer maximum dimension less than the inner maximum dimension.

In an embodiment of the present invention, the washer at least one outer portion comprises a first rectangular side profile.

In an embodiment of the present invention, the washer at least one second outer portion comprises: a second rectangular side profile.

In an embodiment of the present invention, the washer at least one first outer portion comprises a first tapered portion defining a first tapered profile and a first planar portion defining the first outer surface.

In an embodiment of the present invention, the washer at least one second outer portion comprises: a second tapered portion defining a second tapered profile and a second planar portion defining the second outer surface.

In an embodiment of the present invention, the mating member comprises: a non-deformable fastener having at least one outer portion, wherein the non-deformable fastener at least one outer portion contacts the deformable member to deform the deformable member.

In an embodiment of the present invention, the non-deformable fastener is a bolt having a shaft and head, the head including an underside including at least one step defining the outer portion, wherein the at least one step mates with the deformable member to deform the deformable member and continues to deform the deformable member until the outer portion contacts the deformable member at a desired clamp load.

In an embodiment of the invention, the deformable member receives the bolt and may comprise a clamped component such as a workpiece or the like.

In another embodiment of the present invention, the non-deformable fastener comprises a clinch fastener that seals with the deformable member, wherein the deformable member is a staking or mating material.

In an embodiment of the present invention, the clinch fastener comprises: a bolt having a shaft and a head, the head including an undersurface including at least one step defining the at least one outer portion, wherein the at least one step mates with the mating material to deform and clinch, and seal with the mating material.

In an embodiment of the invention, the clinch fastener comprises at least one retention groove, wherein when the bolt is staked through the mating material, a portion of the deformable mating material flows into the at least one retention groove.

In an embodiment of the invention, the at least one step is not deformable and mates with the deformable member. In another embodiment of the invention, the at least one step is deformable and forms a seal with the mating member.

In another embodiment of the present invention, the bolt can be used in a system which also comprises a nut member and a clamped component between the bolt and the nut member, where preferably, the clamped component is formed of a material that is softer than both the bolt and the nut member and that deforms to seal with the bolt and nut member when the system is clamped together.

An embodiment of the present invention generally relates to fluid handling circuits that require tube or hose end fittings where clamp force is applied to form a leak-proof joint. Clamp force is generated by applying torque to a mechanical fastener that brings two or more parts together, forming an intimate contact. One or more of the parts in the joint will be softer than the others, usually a washer or clamped component, deforming under the clamp load to promote a leak-proof seal. Nevertheless, leaks can occur even with a normally applied torque if there is not enough material deformation to seal the fluid path. This is because adjacent soft and hard surfaces are flat and smooth, which forces the seal to rely primarily on the stiffness difference of the soft and hard material. An embodiment of the present invention integrates geometric features that promote the deformation of the softer material thus creating a more effective seal.

The present invention also includes an embodiment that relates to indicating and thus, helping to control the clamp force in a bolted joint. Torque is normally used to achieve the desired clamp load, but there is typically a large variation in actual clamp load due to the variation in frictional forces. An embodiment of the present invention integrates geometric features into a fastener to produce a visual clamp load indicator which functions to identify when the desired clamp load is achieved.

The present invention also includes an embodiment that relates to providing a seal in a clinched fastener system.

In an embodiment of the present invention, a fastening system is provided including a non-deformable fastener having at least one outer portion, wherein the non-deformable fastener at least one outer portion contacts the deformable member to deform the deformable member.

In an embodiment of the present invention, a deformable fastening system includes a deformable member and a non-deformable mating member. The non-deformable mating member is a fastener including a bolt having a shaft including a thread formed thereon, and a head having an undersurface including at least one inner step formed thereon. The shaft of the bolt is inserted through a passage in the deformable member to engage a corresponding thread on a nut member and the head of the bolt is rotated to move the bolt into the nut member during a tightening cycle. The at least one inner step of the bolt engages a mating surface of the deformable member to clamp the deformable member when the bolt is moved into the nut member causing an increase in axial load during the tightening cycle to deform the deformable member.

In an embodiment of the present invention, a deformable fastening system includes a clamped component and a fastener including a bolt having a shaft having a thread formed thereon and a head having an undersurface including at least one inner step formed thereon. The undersurface of the head includes at least one inner step formed thereon defines at least one outer portion of the head. The shaft of the bolt is inserted through a hole in the clamped component to engage a corresponding thread on a nut member and the head of the bolt is rotated to move the bolt into the nut member during a tightening cycle. The at least one inner step of the bolt engages a mating surface of the clamped component to clamp the clamped component when the bolt is moved into the nut member causing an increase in axial load during the tightening cycle to deform the clamped component.

In an embodiment of the present invention, the non-deformable fastener is a bolt having a shaft and head, the head including an underside including at least one step defining the at least one outer portion, wherein the at least one step mates with the deformable member to deform the deformable member and continues to deform the deformable member until the outer portion contacts the deformable member at a desired clamp load.

In an embodiment of the present invention, the at least one step defining the at least one outer portion of the non-deformable fastener engages a mating surface of the deformable member to clamp the deformable member when the bolt is moved, causing a significant increase in torque during the tightening cycle as compared to a conventional head having a flat, non-stepped undersurface, which indicates that a predetermined clamp load has been reached. During installation, the increasing axial load causes the deformable member to deform until a desired clamp load is reached. When using torque and angle feedback installation equipment, there will be a sudden rise in torque once the undersurface engages the clamped component. This feedback will enable the installation equipment to ensure that full contact and that the required clamp load has been achieved.

In an embodiment of the present invention, a deformable fastening system includes a clamped component and a fastener including a bolt having a shaft portion extending along a longitudinal axis of the fastener. The shaft portion includes a securing portion formed thereon. The shaft portion of the bolt is inserted through a passage in the clamped component to engage a corresponding thread on a nut member and the head portion of the bolt is rotated to move the bolt into the nut member during a tightening cycle.

A head portion of the fastener includes a surface having at least one engagement portion and one or more projections formed on the at least one engagement portion. The one or more projections are formed on the at least one engagement portion of the surface of the head portion generally proximate the shaft portion in a substantially circular and concentric arrangement with the longitudinal axis and shaft portion. The one or more projections formed on the at least one engagement portion of the surface of the head of the bolt engage a mating surface of the clamped component to clamp the clamped component when the bolt is moved into the nut member causing an increase in axial load during the tightening cycle to deform the clamped component.

In an embodiment of the present invention, a fastener includes a bolt having a shaft portion extending along a longitudinal axis of the fastener, wherein the shaft portion including a securing portion formed thereon. A head portion of the fastener includes a surface having at least one engagement portion integrally formed on the surface. The at least one engagement portion includes one or more projections formed on the surface of the head portion generally proximate the shaft portion and in arrangement with the longitudinal axis and shaft portion. The one or more projections include at least one first projection extending generally circumferentially about the surface of the head portion relative to the longitudinal axis. The at least one first projection is formed with at least one geometric profile as part of the surface of the head portion of the fastener to provide a sealing arrangement between the fastener and a clamped component.

In another embodiment, a fastener includes a bolt having a head portion and a shaft portion extending along a longitudinal axis of the fastener, the shaft portion including a securing portion formed thereon. The head portion includes a surface including at least one engagement portion integrally formed on the surface. The at least one engagement portion includes one or more projections formed on the surface of the head portion generally proximate the shaft portion and in arrangement with the longitudinal axis and shaft portion. The one or more projections includes at least one first projection extending generally circumferentially about the surface of the head portion relative to the longitudinal axis. The at least one first projection is formed with at least one geometric profile as part of the surface of the head portion of the fastener to provide a sealing arrangement between the fastener and a clamped component. A second projection extends generally circumferentially about the surface of the head portion relative to the longitudinal axis. The second projection is formed as a plurality of discrete members cooperatively arranged to extend circumferentially around the surface of the head portion to provide continuous plurality of lines of contact between the one or more projections and the clamped component.

BRIEF DESCRIPTION OF THE DRAWINGS

One or more embodiments will now be described, by way of example, with reference to the accompanying drawings, in which:

FIGS. 1A, 1B, 2A and 2B show a prior art fastening system having a deformable fastening member installed at the end of a brake hose. FIG. 1A shows an assembly view of the pre-installed state (in partial cross-section) and wherein, FIG. 1B shows an enlarged cross-sectional view of FIG. 1A, taken along the line A-A in FIG. 1A. FIG. 2A shows an assembly view of the post-installed state (in partial cross-section) and wherein, FIG. 2B shows an enlarged cross-sectional view of FIG. 2A, taken along the line B-B in FIG. 2A.

FIG. 3 provides a top view of a deformable washer that is in accordance with a first embodiment of the present invention, wherein the deformable washer has outer portions on both the top and the bottom where the outer portions each have a rectangular side profile;

FIG. 4 provides a side view of the deformable washer shown in FIG. 3.

FIGS. 5A, 5B, 6A, and 6B show a deformable fastening system which is in accordance with an embodiment of the present invention being installed at the end of a brake hose, wherein the fastening system includes deformable members that are stepped washers, such as is shown in FIGS. 3 and 4. FIG. 5A shows an assembly view of the pre-installed state (in partial cross-section) and wherein, FIG. 5B shows an enlarged cross-sectional view of FIG. 5A, taken along the line C-C in FIG. 5A. FIG. 6A shows an assembly view of the post-installed state (in partial cross-section) and wherein, FIG. 6B shows an enlarged cross-sectional view of FIG. 6B, taken along the line D-D in FIG. 6A.

FIG. 7 provides a top view of a deformable washer that is in accordance with a second embodiment of the present invention, wherein the deformable washer is tapered on both the top and the bottom;

FIG. 8 provides a side view of the deformable washer shown in FIG. 7;

FIGS. 9A, 9B, 10A and 10B show a deformable fastening system which is in accordance with another embodiment of the present invention being installed at the end of a brake hose, wherein the deformable fastening system includes deformable members that are tapered washers, such as is shown in FIGS. 7 and 8.

FIG. 9A shows an assembly view of the pre-installed state (in partial cross-section) and wherein, FIG. 9B shows an enlarged cross-sectional view of FIG. 9A, taken along the line E-E in FIG. 9A.

FIG. 10A shows an assembly view of the post-installed state (in partial cross-section) and wherein, FIG. 10B shows an enlarged cross-sectional view of FIG. 10B, taken along the line F-F in FIG. 10A.

FIG. 11 shows a top view of a non-deformable fastener of a fastening system defined by a bolt which is in accordance with an embodiment of the present invention;

FIG. 12 shows a side, cross-sectional view of the bolt shown in FIG. 11, taken along line G-G of FIG. 11;

FIG. 13 shows a bottom view of the bolt shown in FIGS. 11 and 12.

FIG. 14 shows the fastening system in accordance with an embodiment of the present invention in a pre-installed state;

FIG. 15 shows the fastening system in accordance with an embodiment of the present invention in a post-installed state;

FIGS. 16, 17 and 18 show a deformable fastening system (in side, cross-section, and bottom view) which is in accordance with another embodiment of the present invention, wherein the fastening system includes a non-deformable fastener defined by a bolt, and wherein FIG. 16 shows the pre-installed state of the system, FIG. 17 shows a cross sectional view of Section H-H of FIG. 16, and FIG. 18 shows a bottom view of FIG. 16;

FIG. 19 shows the post-installed state of the bolt showed in FIGS. 16-19 installed to form a sealed deformable fastening system with a deformable member;

FIG. 20 shows a perspective view of a fastening system in accordance with an embodiment of the present invention;

FIG. 21 shows a bottom plan view of a fastening system in accordance with an embodiment of the present invention;

FIG. 22 shows a side plan view of a fastening system in accordance with an embodiment of the present invention;

FIG. 23 shows a sectional side plan view of a portion of a head of a fastener of a fastening system in accordance with an embodiment of the present invention;

FIG. 24 shows a top plan view of a fastener of a fastening system positioned proximate a workpiece or component in accordance with an embodiment of the present invention;

FIG. 25 shows a sectional side plan view of a fastening system positioned proximate a workpiece or component in accordance with an embodiment of the present invention;

FIG. 26 shows a sectional side plan view of a portion of a head of a fastener of a fastening system positioned proximate a workpiece or component in a pre-installed state in accordance with an embodiment of the present invention;

FIG. 27 shows a sectional side plan view of a fastening system engaging a portion of a workpiece or component in a pre-installed state in accordance with an embodiment of the present invention;

FIG. 28 shows a sectional side plan view of a portion of a head of a fastener of a fastening system engaging a portion of a workpiece or component in a post-installed state in accordance with an embodiment of the present invention; and FIG. 29 shows a perspective view of another aspect of the fastening system in a post-installed state in accordance with an embodiment of the present invention.

The appended drawings may present a somewhat simplified representation of various features of the present disclosure as disclosed herein, including, for example, specific dimensions, orientations, locations, and shapes. Details associated with such features will be determined in part by the particular intended application and use environment.

DESCRIPTION OF ILLUSTRATED EMBODIMENTS

The components of the disclosed embodiments, as described and illustrated herein, may be arranged and designed in a variety of different configurations. Thus, the following detailed description is not intended to limit the scope of the disclosure, as claimed, but is merely representative of possible embodiments thereof. In addition, while numerous specific details are set forth in the following description in order to provide a thorough understanding of the embodiments disclosed herein, some embodiments can be practiced without some of these details. Moreover, for the purpose of clarity, certain technical material that is understood in the related art has not been described in detail in order to avoid unnecessarily obscuring the disclosure.

The drawings are in simplified form and are not to precise scale. For purposes of convenience and clarity only, directional terms such as upper, lower, top, bottom, left, right, up, over, above, below, beneath, rear, and front, may be used with respect to the drawings. These and similar directional terms are not to be construed to limit the scope of the disclosure. Furthermore, the disclosure, as illustrated and described herein, may be practiced in the absence of an element that is not specifically disclosed herein.

The detailed description is merely exemplary in nature and is not intended to limit the application and uses. There is no intention to be bound by any expressed or implied theory presented herein. The use of ordinals such as first, second and third does not necessarily imply a ranked sense of order, but rather may only distinguish between multiple instances of an act or structure.

The deformable fastening system includes a deformable member and a mating member that seals with the deformable member. FIG. 3 provides a top view of the deformable member defined by a stepped washer 30 that is in accordance with an embodiment of the present invention, while FIG. 4 provides a side view of the same washer 30. As shown in FIGS. 3 and 4, the washer 30 includes at least one outer portion 32, shown as two outer portions 32 on both the top 34 and the bottom 36 of the washer 30 (while FIGS. 3 and 4 show one step 32 on both the top 34 and the bottom 36 of the washer, only one outer portion on only one side of the washer 30 may be provided. Additionally, the washer 30 can be provided as having more than one outer portions on each of the top 34 and bottom 36, or even an unequal number of outer portions on each of the top 34 and the bottom 36), and a hole 38 is provided in the center 40 of the washer. As such, the washer 30 has a uniform middle portion having an outer diameter 42 (FIG. 3) defined by the largest measurement, an inner maximum dimension, across the middle portion 44 of the washer 30 and an inner minimum diameter 46 defined by the hole 38 in the middle of the washer 30.

In an embodiment of the present invention, the washer has sides, a first and a second side, (top 34 and bottoms 38 shown in FIG. 4) wherein the first and second sides are bounded by a respective, first and second outer axial maximum dimensions, shown as outer diameters 48, 50 defined by at least one first and second outer portions (steps 32) of the washer 30.

Preferably, the washer 30 is symmetrical such that the outer diameter 48, 50 of each of the steps 32 (i.e., respectively on both the top 34 and the bottom 36 of the washer 30) is generally equal.

The outer portions 32 on the top 34 and bottom 36, respectively, of the washer 30 are preferably formed using two opposing dies that have the step(s) shape formed in them. A fixed stroke machine is preferably used to compress the washer material and form the steps using the dies. The steps can be formed either during normal production of the washer using specially shaped tooling (with the stepped features), or as a secondary operation using similar tooling.

FIGS. 5A, 5B, 6A, and 6B show a deformable fastening system 52 being used to install a flow bolt 10 on a brake hose 12 where the deformable fastening system 52 employs the stepped deformable washer 30 shown in FIGS. 3 and 4, described previously. Specifically, FIGS. 5A and 5B show the pre-installed state while FIGS. 6A and 6B show the post-installed state. In fact, two of the stepped washers 30 are used. Therefore, in FIGS. 5A, 5B, 6A and 6B, one washer is identified with reference numeral 30*a* and the other is identified with reference numeral 30*b*, to distinguish one from the other, yet both are preferably identical to washer 30 shown in FIGS. 3 and 4.

Initially, a deformable stepped washer 30*a* (identical to the stepped washer 30 shown in FIGS. 3 and 4) is slid onto the shaft 54 of the flow bolt 10 and then the shaft 54 of the flow bolt 10 is inserted through a bore 14 provided in a connector 16 at the end of the brake hose 12. At this point, the washer 30*a* is disposed between a head 22 of the flow bolt 10 and the connector 16. Then, another stepped washer 30*b* (also preferably identical to the stepped washer 30 shown in FIGS. 3 and 4) is slid onto the shaft 54 of the flow bolt 10 and then a securing member 26, such as a nut member, is threaded or otherwise engaged with the shaft 54 of the flow bolt 10. At this point, the washer 30*b* is disposed between the connector 16 and the securing member 26, and the overall assembly looks as shown in FIG. 5. Then, the deformable fastener system 52 is tightened such as by rotating the head 22 of the flow bolt 10 and/or securing member 26, or the securing member 26 is crimped onto the shaft 54 of the flow bolt 10. Regardless, tightening of the fastening system 52 causes the stepped washers 30*a*, 30*b* to compress or crush against the connector 16 thereby forming a seal. During installation, the top 34 and bottom 36 of each of the washers 30*a*, 30*b* (see FIG. 6) can be crushed such that the thickness of each washer after installation equals the thickness of the middle portion 44 (shown in FIG. 4 for illustrative purposes) of each washer as it existed before installation (see FIGS. 5A, and 5B), but this is not imperative.

Providing that the washers 30*a*, 30*b* have at least outer portion 32 (see washer 30 shown in FIGS. 3 and 4, which is identical) on both the top 34 and the bottom 36, and was effectively pre-crushed before being used in the flow bolt installation process provides that the clamp force is reduced as a result of the contact area of the scaled joint being reduced compared to the contact area of a conventional, non-stepped washer. Processing the washer 30 shown in FIGS. 3 and 4 to give it one or more outer portions on both the top 34 and the bottom 36 reduces the force required to install, for example, a flow bolt, while still maintaining the radial strength of the washer. Additionally, the washer 30 has a first thickness 49 before installation into the deformable fastening system that equals the sum of a middle portion thickness 43*a* measured longitudinally across the inform middle portion and a step thickness 45 measured longitudinally across the at least one step (or across each step where there are a plurality of steps), wherein, when installed into the deformable fastening system, the washer has a second thickness 43*b* (shown in FIG. 6B) equal to the middle portion thickness 43*a* due to the deformation of the washer.

In contrast, conventional washers are of a single thickness and have more crush area than necessary to seal and to ensure sufficient radial strength. Preferably, the washer design is matched to compensate for reduced thread strength in that the crush area is reduced approximately by the amount of thread strength reduction. The thread strength may be compromised in that the thread on either the flow bolt 10 or the nut member 26 may be susceptible to stripping if the flow bolt includes one or more external flutes 28 across the threads in order to provide a fluid flow path, such as is shown in FIGS. 5 and 6. Using stepped washers 30*a*, 30*b* (see FIGS. 3 and 4 which shows washer 30 which is identical) compared to conventional washers provides that less axial force is required to crush and seal the washers to the flow bolt 10 and to both the connector assembly 16 and securing member 26 due to the smaller washer contact area.

FIG. 7 provides a top view of a deformable member defined by a tapered washer 60 that is in accordance with another embodiment of the present invention, while FIG. 8 provides a side view of the same washer 60. As shown, the washer 60 includes at least one outer portion having at least one taper 62 and at least one uniform middle portion 72 having an inner maximum dimension 71. In an embodiment of the present invention shown in FIG. 8, there are two tapers 62 that are each respectively defined by a first and second tapered profile. There are also two planar portions shown in FIG. 8, a first planar portion, the top 64, having a and second planar portion, the bottom 66, respectively, defining a first and a second outer surface of the washer, and a hole 68 is provided in the center 70 of the washer having an inner minimum diameter 63.

The top 64 first planer surface and bottom 66 second planer surface, each respectively define a first outer maximum dimension 65, and a second outer maximum dimension 67 that is smaller than the first inner maximum dimension 71 of the uniform middle portion 72 of the washer 60. Preferably, the washer 60 is symmetrical such that each of the tapers 62 (i.e., on both the top 64 and the bottom 66 of the washer) are generally the same with regard to height and slope.

Additionally, the washer 60 (shown in FIG. 8 has a first thickness 79 before installation into the deformable fastening system that equals the sum of a middle portion thickness 73*a* measured longitudinally across the inform middle portion and a step thickness 75 measured longitudinally across the at least one step (or across each step where there are a plurality of steps), wherein, when installed into the deformable fastening system, the washer has a second thickness 73*b* (shown in FIG. 10B) equal to the middle portion thickness 73*a* due to the deformation of the washer. The tapers 62 on the washer 60 are preferably formed using two opposing dies that are specifically shaped to form the tapers. A fixed stroke machine is preferably used to compress the washer material and form the tapers 62 using the dies. The tapers 62 can be formed either during normal production of the washer using specially shaped tooling (with the taper features), or as a secondary operation using similar tooling.

FIGS. 9A, 9B, 10A, and 10B show a fastening system 70 being used to install a flow bolt 10 on a brake hose 12. The fastening system employs the tapered washer 60 shown in FIGS. 7 and 8, described previously. Specifically, FIGS. 9A and 9B show the pre-installed state while FIGS. 10A and 10B show the post-installed state. In fact, two of the tapered washers 60 are used. Therefore, in FIGS. 12 and 13, one washer is identified with reference numeral 60*a* and the other is identified with reference numeral 60*b*, to distinguish one from the other. Therefore, in FIGS. 9A, 9B, 10A and 10B, one washer is identified with reference numeral 60*a* and the other is identified with reference numeral 60*b* to distinguish one from the other, yet both are preferably identical to washer 60 shown in FIGS. 7 and 8.

Initially, a tapered washer 60*a* (identical to the tapered washer 60 shown in FIGS. 7 and 8) is slid onto the shaft 54 of the flow bolt 10 and then the shaft 54 of the flow bolt 10 is inserted through a bore 14 provided in a connector 16 at the end of the brake hose 12. At this point, the washer 60*a* is disposed between a head 22 of the flow bolt 10 and the connector 16. Then, another tapered washer 60*b* (also preferably identical to the tapered washer 60 shown in FIGS. 7 and 8) is slid onto the shaft 54 of the flow bolt 10. Then, a securing member 26, such as a nut member, is threaded or otherwise engaged with the shaft 54 of the flow bolt 10. At this point, the washer 60*b* is disposed between the connector 16 and the securing member 26, and the overall assembly looks as shown in FIGS. 9A and 9B. Then, the fastener system 70 is tightened such as by rotating the head 22 of the flow bolt 10 and/or securing member 26, or the securing member 26 is crimped onto the shaft 54 of the flow bolt 10. Regardless, tightening of the fastener system 70 causes the tapered washers 60*a*, 60*b* to compress or crush against the connector 16, thereby forming a seal as shown in FIGS. 10A and 10B. During installation, the top 64 and bottom 66 of the washer 60 (see FIGS. 10A and 10B) can be crushed such that the thickness of the washer 60 after installation substantially equals the thickness of the middle portion 72 (shown in FIG. 8) of the washer 60 as it existed before installation (sec FIGS. 9A and 9B), but this is not imperative.

Providing that that the washers 60*a*, 60*b* have at least one taper 62 (see washer 60 shown in FIGS. 7 and 8, which is identical), and was effectively pre-crushed before being used in the flow bolt installation process provides that the clamp force is reduced as a result of the contact area of the washer forming the sealed joint being reduced compared to that of the contact area of a conventional, non-tapered washer. The fact that the washers 60*a*, 60*b* have at least one taper 62 on the top 64 and bottom 66 reduces the force required to install the washer to seal with the flow bolt 10 and to the connector assembly 16, for example, a flow bolt 10, while still maintaining the radial strength of the washers 60*a*, 60*b*. Preferably, the washer design is matched to compensate for reduced thread strength in that the crush area is reduced approximately by the amount of thread strength reduction. As discussed above, the thread strength may be compromised in that the thread of either the bolt or the nut member may be susceptible to stripping if the flow bolt 10 includes one or more external flutes 28 (shown in FIGS. 9A, 9B, 10A, 10B) across the threads in order to provide a fluid flow path.

Using tapered washers 60*a*, 60*b* (sec FIGS. 7 and 8 which shows washer 60 which is identical) compared to conventional washers provides that less axial force is required to crush and seal the washer to the flow bolt 10 and to both the connector assembly 16 and the securing member 26 due to the smaller crush area.

The stepped and tapered washers as shown in FIGS. 3-4 and 7-8, respectively, can be used to install standard, non-flow bolts as well as flow bolts, and specifically flow bolts having one or more external flutes running across the threads. Regardless, using the non-conventional washers disclosed herein provides for a reduced crush area which results in less clamp force being required for proper installation. Even standard flow bolts which do not have one or more external flutes cut or otherwise formed across the threads would benefit from a reduced clamp load due to the lower cross-sectional area of the bolt.

During installation, the increasing axial load causes the deformable fastening member (i.e., the stepped or tapered washers, as described above) to deform until a desired clamp load is reached. The outer portions cause the contact area to be less than the contact area of a conventional non-deformable or non-stepped washer. Even though less material is in contact, the washer material that is loaded deforms more to better seal any voids in the joint. This seals the joint with a lower axial force (torque) than when a standard crush washer is used.

FIGS. 11, 12, and 13 provide a top view, side cross-sectional view, and bottom view, respectively, of a non-deformable fastener defined by a bolt 100 which is in accordance with an embodiment of the present invention. As shown, the bolt 100 includes a head 102 (see FIGS. 11 and 12) and a shaft 104 (see FIGS. 12 and 13) having a thread 106 formed thereon. Both the head 102 and the shaft 104 may be conventional except for the undersurface 108 under the head 102, which is provided as having at least one inner step or engagement portion 110 formed on a portion of the undersurface 108 of the head 102 of the bolt 100, wherein the at least one inner step 110 defines the at least one outer portion of the deformable fastening system.

In an embodiment of the invention, the undersurface 108 may have at least one geometric feature formed thereon that may be a "torque robbing feature" such as adding texture or ribs to the undersurface 108 that provides high friction to the undersurface 108 when contacting a mating surface of a deformable member, such as a clamped component 124. It is understood that the clamped component 124 may be formed of various materials, including, but not limited to, polymers, metals, and the like. It is contemplated that a layer of material, such as paint, a coating, or the like, may be applied to the clamped component 124. The layer of material may cooperate with the clamped component to provide additional features such as a decorative appearance, material protection or other physical function or aesthetic appearance. The texture may be any geometry that transforms the undersurface 108 into a high friction surface. One such feature preferably may be at least one geometric feature integrally formed on to the metal bolt 100 such as texture or ribs added to the undersurface 108 that makes the undersurface 108 a high friction surface and allows the required clamp load to be reached faster with less torque applied to seal the deformable fastening system.

As shown in FIG. 13, preferably the at least one step or engagement portion 110 is circular and concentric with the shaft 104 (and the bolt 100 in general). FIGS. 14 and 15 provide cross-sectional views of a fastening system 120 that is in accordance with an embodiment of the present invention. The fastening system 120 employs the bolt 100 shown in FIGS. 11-13, described previously, as well as a nut member 122 and a clamped component 124, such as a workpiece or the like, which is disposed between the nut member 122 and the undersurface 108 of the head 102 of the bolt 100. Preferably, the clamped component 124 is made of a softer material such as a metal, polymer, or composite, than both the metal bolt 100 and the nut member 122. In another embodiment, a deformable washer (not shown) may be utilized if the clamped component 124 is not deformable.

In the embodiment shown in FIGS. 14-15, the bolt 100 is a non-deformable fastener and the clamped component is the deformable member. However, in another embodiment of the present invention, the at least one step or engagement portion 110 may be a softer material than a mating surface and may deform to seal against the mating surface. In this embodiment, the at least one step is the deformable member, and the mating surface is the mating member. In yet another embodiment, each of the least one step 110 formed in the undersurface of the head 102 of the fastener 100 and the clamped component 124 are deformable when the at least one step 102 mates with the clamped component 124.

While FIG. 14 shows the fastening system 120 before the bolt 100 is installed, FIG. 15 shows the fastening system 120 after the bolt 100 is installed. As shown in FIG. 14, initially the shaft 104 of the bolt 100 is inserted through a hole or passage 126 in the clamped component 124, and the thread 106 on the shaft 104 is engaged with a corresponding thread 128 in the nut member 122, causing the clamped component 124 or workpiece to be effectively captured between the head 102 of the bolt 100 and the nut member 122.

To fully install the bolt 100 and nut member 122 with the clamped component 124 in one embodiment of the tightening cycle, the bolt 100 is rotated using the head 102, in order for the bolt 100 to move more fully into the nut member 122 and clamp down on the clamped component 124. In another embodiment of the tightening cycle, the nut member 122 is rotated along the thread 106 of the shaft 104 of the bolt 100 to move the nut member 122 toward the head 102 of the bolt 100 and capture the clamped component 124 therebetween. Providing one or more outer portions of the at least one inner step or engagement portion 110 under the head 102 (i.e., on the undersurface 108 of the head 102) causes a significant increase in torque during the tightening cycle as compared to a conventional head having a flat, non-stepped undersurface, which indicates that a predetermined clamp load has been reached.

During installation, the increasing axial load causes the clamped material (i.e., clamped component 124) to deform until a desired clamp load is reached. The area of the outer portion 110 is calculated so that the required clamp load is reached once the undersurface 108 (i.e., the surface indicated with reference numeral 108 in FIG. 14) in the bolt 100 contacts the clamped component 124. Thus, if there is no gap between the undersurface (i.e., the surface indicated with reference numeral 108 in FIG. 14) and the clamped component 124, verification of sufficient clamp load is visual. Additionally, when using torque & angle feedback installation equipment, there will be a sudden rise in torque once the undersurface (i.e., the surface indicated with reference numeral 108 in FIG. 14) engages the clamped component 124. This feedback will enable the installation equipment to ensure that full contact and that the required clamp load has been achieved.

While the bolt 100 has been shown having a head 102 with an external hex profile, the head 102 can be provided as having many other different profiles, such as an internal hex profile or even a multi-lobular profile, either internal or external. Additionally, while the term nut member has been used regarding part number 122, the nut member may be anything to which one wants to install the bolt. Thus, the clamped component may be any member that is clamped or captured between the mating member and another component of the deformable fastening system. Finally, the clamped component 124 may be a member to clamp in the overall assembly using the bolt 100. In another embodiment of the system, a non-deformable fastener comprises: a clinch fastener that seals with and clinches to the deformable member.

As shown in FIGS. 16-19, the deformable fastening system is in accordance with another embodiment of the present invention, wherein the deformable fastening system 220 (shown in FIG. 19) includes a non-deformable fastener defined by a bolt 200 having a clinch feature. FIG. 16 shows the pre-installed state of the system; FIG. 17 shows a cross sectional view of Section H-H of FIG. 16, FIG. 18 shows a bottom view of FIG. 16, and FIG. 19 shows the post-installed state of the system, wherein the deformable member is a staking or mating material 222.

As shown, the bolt 200, similar to the bolt 100 in FIGS. 11-15, includes a head 202 (see FIGS. 16 and 19) and a shaft 204 (see FIGS. 16, 18, and 19). Both the head 202 and the shaft 204 may be conventional except for the undersurface 208 under the head 200, which is provided as having at least one inner step 210 thereon (shown in detail in FIG. 17), wherein the undersurface 208 and the at least one inner step 210 have similar features to the corresponding undersurface 108 and at least one inner step 210 associated with bolt 100.

As shown in FIG. 18, additional features may be added such as ribs 232 to reduce provide resistance to axial rotation.

Additionally, the bolt 200 has a clinch feature, shown as retaining groove 230 that allows for flow and retention of retained material 222 (shown in FIG. 19) during a staking operation. Preferably, the retained staking material 222 is softer than the bolt material. The at least one step 210 defining at least one outer portion mates with the staking material and acts as sealing feature and may include more than one step to further seal with the staked material 222.

While FIG. 16 shows the fastening system 220 before the bolt 200 is installed, FIG. 19 shows the fastening system 220 after the bolt 200 is installed into staking material 222.

During installation, the increasing axial load causes the staked material 222 to deform and a portion of the staked material flows into the retention groove, thereby clinching the staked material 222 and forming a seal with the staked material 222.

While the embodiment shown in FIG. 16-19 are directed to a clinch bolt, additional embodiments may be directed to an equivalent clinching features of a clinch nut.

With regard to installation of any of the fastening systems disclosed herein (i.e., as shown in FIGS. 5A, 5B, 6A, 6B, 9A, 9B, 10A, 10B and 14-15), a programmable drive system can be utilized, preferably a drive system capable of performing a torque angle tightening strategy. Regardless, the bolt clamped component configuration disclosed herein provides for a reduced crush area that effectively translates into less axial force being needed to properly install the bolt. Additionally, in several embodiments of the invention as shown in FIGS. 16-19, additional sealing features are provided.

Referring now to FIGS. 20-28, another embodiment of the fastening system of the present invention is presented. The fastening system 150 includes a fastener or bolt 100 having a head portion 102 defining a flanged portion 101 and an external drive profile 103. In one embodiment, the fastener 100 may be fabricated from one or more of the following materials: titanium, titanium alloys; nickel-chrome alloys, stainless steel, mild steel, cast iron, aluminum, aluminum alloys, etc., without limitation.

As shown in Figures, the external drive profile 103 of the head 102 includes a plurality of drive surfaces or drive walls 105 configured in a hexagonal or "hex" profile. It is understood that the drive surfaces or drive walls of the external drive profile of the head 102 may be formed with various other geometric shapes or profiles, including, for exemplary purposes, an internal hex profile, an internal multi-lobular profile, or an external multi-lobular profile.

The fastener 100 further defines a shaft portion 104 having a threaded or securing portion 106 formed thereon for mechanically coupling the fastener to a workpiece, clamped component, or the like. The shaft portion 104 extends along and defines a longitudinal axis 107 of the fastener 100. As shown in the Figures, the diameter of the shaft portion 104 is smaller than the diameter of the flanged portion 101 of the head portion 102.

The flanged portion 101 of the head portion 102 projects generally radially outwardly from the longitudinal axis 107 and shaft portion 104. The flanged portion 101 may have a generally circular shape orthogonal to the longitudinal axis 107, or, alternatively, a square shape, a hexagonal shape, or another shape depending upon the needs of the specific application. The head portion 102 generally defines a surface 108 incorporating at least one inner step or engagement portion 110.

In some embodiments shown in FIGS. 20 and 21, the at least one engagement portion 110 may include one or more projections 112, 114. The one or more projections 112 may be formed on the surface 108 of the head portion 102 generally proximate the shaft portion 104 of the fastener 100 in a substantially circular and concentric arrangement with the longitudinal axis 107 and shaft 104 of the fastener 100. It is understood that other geometric configurations, including, without limitation, an ellipse, or the like, may be utilized with the one or more projections 112, 114. It is understood that the one or more projections 112, 114 of the at least one engagement portion 110 may be formed as one or more unitary rings extending circumferentially around the surface 108 of the head portion 102.

In some embodiments, the at least one engagement portion 110 of the head portion 102 of the fastener 100 may include at least one first projection 112 extending generally circumferentially about the surface 108 of the head portion 102 relative to the longitudinal axis 107. It is also contemplated that the at least one first projection 112 may be formed as a sealing ring. In some embodiments, the at least one first projection 112 is integrally formed on the surface 108 of the head portion 102 of the fastener 100. The at least one first projection 112 may be provided on the at least one engagement portion 110 of the fastener 100 to provide a sealing arrangement when the fastener 100 is secured to the clamped component 124.

In some embodiments, the at least one first projection 112 may be formed with a geometric profile, including without limitation, a multiple arcuate shaped profile or a plurality of progressively reduced diameter profiles or the like, as part of the surface 108 of the head portion 102 of the fastener 100. The geometric profile of the at least one first projection 112 may include multiple cooperating profiles, such as redundant multiple arcuate shaped surfaces to engage and deform a workpiece or clamped component 124 at various depths to provide a sealing arrangement between the fastener 100 and clamped component 124, whereby the scaling ring 112 provides continuous plurality of lines of contact between the sealing ring 112 and a mating surface of the clamped component 124 and protects areas of the clamped component 124 exposed by one or more of the projections 112, 114 from corrosion.

In some embodiments shown in FIGS. 23, 26 and 28, the at least one first projection 112 may be formed with multiple geometrically shaped engagement surfaces 116, 118 to engage a workpiece or clamped component at various depths to provide a sealing arrangement between the fastener 100 and clamped component 124. In some embodiments, the at least one first projection 112 may include two or more projections, wherein the two or more projections are disposed adjacent to and in a cooperating arrangement to form two or more sealing rings.

The multiple engagement surfaces 116, 118 may include at least two engagement surfaces formed with a variety of geometric profiles, including, but not limited to, a generally arcuate shaped profile, a progressively reduced diameter profile or the like. In some embodiments, the engagement surface 116 of the at least one first projection 112 may be positioned a further distance from the longitudinal axis 107 relative to the engagement surface 118. In some embodiments, the engagement surface 116 may be positioned at an increased height or further distance from the surface 108 of the head portion 102 relative to the height of engagement surface 118 to form offset positions for the engagement surfaces 116 and 118 to provide distinct engagement depths and enhanced sealing features when the at least one first projection 112 is connected to the workpiece or clamped component 124.

It is also contemplated that, in some embodiments, the engagement surface 118 of the at least one first projection 112 may be positioned a further distance from the longitudinal axis 107 relative to the engagement surface 116. In some embodiments, the engagement surface 118 may be positioned at an increased height or further distance from the surface 108 of the head portion 102 relative to the height of the engagement surface 116 to form offset positions for the engagement surfaces 116 and 118 to provide distinct engagement depths and enhanced sealing features when the at least one first projection 112 is connected to the workpiece or clamped component 124.

In some embodiments, the increased depth and offset position of the engagement surface 116 relative to the engagement surface 118, or the increased depth and offset position of the engagement surface 118 relative to the engagement surface 116 results in the engagement surface with an increased height or further distance from the surface 108 of the head portion 102 engaging the workpiece or clamped component 124 to provide a first sealing arrangement. The engagement surfaces with increased depth and offset position, shown as engagement surface 116 in the Figures, assists in protecting the engagement surface 118 with a reduced height relative to engagement surface 116 from damage during material and part handling prior to and during engagement of the fastener 100 to a clamped component 124. Further, the engagement surface, shown as engagement surface 118 in the Figures, may be formed with a reduced height relative to engagement surface 116 to provide a second sealing arrangement. In some embodiments, the at least one engagement surface 110 of the fastener 100 may include three or more engagement surfaces or rings, wherein two or more engagement surfaces 116 may be formed with an increased height or positioned a further distance from the surface 108 of the head portion 102 relative to the height or position of the engagement surface 118 to protect the engagement surface 118 from damage during part handling, thereby ensuring the engagement surface 118 provides a sealing arrangement of the fastener 100 on the clamped component 124.

Referring now to FIGS. 21 and 23, the one or more projections of the at least one engagement portion 110 of the head portion 102 of the fastener 100 includes a second projection 114 extending generally circumferentially about the surface 108 of the head portion 102 relative to the longitudinal axis 107. It is understood that the at least one engagement portion 110 may be formed with the second projection 114 extending generally circumferentially about the surface 108 of the head portion 102 relative to the longitudinal axis 107. The second projection 114 may be formed radially inward of the at least one first projection 112 relative to the longitudinal axis 107. It is also contemplated that the at least one engagement portion 110 of the fastener 100 may include only the at least one projection 112 on the at least one engagement portion 110 of the surface 108 of the fastener 100.

The second projection 114 may be formed with a geometric profile, including without limitation, a generally arcuate shaped profile, as part of the surface 108 of the head portion 102 of the fastener 100. It is understood that various geometric profiles, such as a progressively reduced diameter profile or the like, may be utilized to form the second projection 114 on the surface 108 of the head portion 102.

It is also contemplated that the second projection 114 extending from the surface 108 of the head portion 102 may be formed as a grounding ring. The grounding ring 114 provides continuous plurality of lines of contact between the grounding ring 114 and a mating surface of the clamped component 124. In some embodiments, the grounding ring 114 is provided on the at least one engagement portion 110 of the fastener 100 to engage and penetrate a coating, such as paint or the like, applied to the engagement surface 126 of the clamped component 124.

It is contemplated that the cooperation between the second projection as a grounding ring 114 and the at least one first projection as a sealing ring 112 allows the grounding ring 114 to be sealed from any outside corrosive elements and maintain connectivity while also trapping debris generated during the installation of the fastener 100 to the clamped component 124 where the grounding ring 114 penetrates and displace a coating and material of the clamped component 124. Further, use of the second projection 114 and the at least one first projection 112 of the at least one engagement portion 110 of the head portion 102 of the fastener 100 may significantly reduce or lower the torque requirements for sealing the fastener 100 a clamped component 124 relative to a standard fastener, reduce damage to the clamped component 124 or coatings applied thereto resulting from the engagement of the fastener 100 of the fastening system 150 relative to a standard fastener, and reduce or eliminate the use of chemical sealants or sealing washers in the fastening process.

As with the at least one first projection 112, it is understood that various geometric profiles may be utilized to form the second projection 114 on the surface of the head portion 102. It is further contemplated that a second projection 114 may be formed with multiple engagement surfaces as described above with the multiple engagement surfaces 116, 118 of the at least one first projection 112 to accomplish the objectives of the present invention, wherein the second projection 114 includes multiple engagement surfaces to provide a grounding arrangement for the fastener 100 around the second projection 114. It is also contemplated that the at least one second projection 114 may be formed as a sealing ring. The second projection 114 may include two or more projections, wherein the two or more projections are disposed adjacent to and in a cooperating arrangement to form two or more sealing rings.

In some embodiments shown in FIG. 29, the one or more projections 112, 114 may be formed as a plurality of discrete members or projections cooperatively arranged to extend circumferentially around the surface 108 of the head portion 102 to provide a continuous plurality of lines of contact between the one or more projections 112, 114 and a mating surface of a workpiece or clamped component 124 as shown in FIGS. 24, 27 and 28. In some embodiments shown in the Figures, the second projection 114 is formed as a grounding ring having a plurality of arcuate shaped discrete members or projections 117, wherein the plurality of discrete members or projections 117 extend generally circumferentially about the surface 108 of the head portion 102 relative to the longitudinal axis 107. The plurality of discrete members or projections provide continuous plurality of lines of contact between the projections and a mating surface of the clamped component. It is understood that the quantity, position and geometric profile of the discrete members or projections 117 may be varied based upon the application associated with the fastener 100.

It is contemplated that the application of a plurality of discrete members cooperatively arranged to form a grounding ring 114, wherein use of a plurality of discrete members substantially reduces the surface area, size and mass of material required to form the grounding ring 114 on the fastener 100. It is also contemplated that use of a plurality of discrete members reduces the overall length of the grounding ring 114 to be embedded in the clamped component, thereby requiring less torque load required to secure the fastener 100 to the clamped component. Further, the depth of penetration of the grounding ring 114 into the clamped component during the fastening process may be evaluated with the plurality of discrete members arrangement shown in FIG. 29.

FIGS. 25 and 26 illustrate the fastening system 150, wherein the fastener 100 is shown prior to engagement with the workpiece 124. FIG. 25 is a cross-sectional view of the fastening system 150, wherein the shaft portion 104 of the fastener 100 extends at least partially through an aperture 130 in a workpiece or clamped component 124 to position the surface 108 of the head portion 102 adjacent a receiving portion 126 of the clamped component 124. The one or more projections 112, 114 of the at least one engagement portion 110 extending from the surface 108 of the head portion 102 are placed proximate the receiving surface 126 of the clamped component 124.

As shown in the Figures, the second projection 114 is disposed on the surface 108 of the head portion 102 of the fastener 100 proximate the shaft portion 104, while the at least one first projection 112 is disposed radially outward of the second projection 114 on the surface 108 of the head portion 102. It is also contemplated that the at least one engagement portion 110 of the head portion 102 of the fastener 100 may be formed with only one of the at least one first projection 112 or the second projection 114 on the surface 108 of the head portion 102.

Referring now to FIGS. 27 and 28 illustrate the fastening system 150 wherein the fastener 100 engages the workpiece or component 124. As best shown in FIG. 26, the one or more projections 112, 114 of the at least one engagement portion 110 extending from the surface 108 of the head portion 102 engage and deform the receiving portion 126 of the clamped component 124 to create a sealing arrangement between the head portion 102 of the fastener 100 and the clamped component 100.

It is contemplated that the cooperation between the second projection as a grounding ring 114 and the at least one first projection as a sealing ring 112 allows the grounding ring 114 to be sealed from any outside corrosive elements and maintain connectivity while also trapping debris generated during the installation of the fastener 100 to the clamped component 124 where the grounding ring 114 penetrates the coating. Further, use of the first projection 112 and at least one second projection 114 of the at least one engagement portion 110 of the head portion 102 of the fastener 100 may significantly reduce or lower the torque requirements for sealing the fastener 100 a clamped component 124 relative to a standard fastener, reduce damage to the clamped component 124 or coatings applied thereto resulting from the engagement of the fastener 100 of the fastening system 150 relative to a standard fastener, and reduce or eliminate the use of chemical sealants or sealing washers in the fastening process.

The detailed description and the drawings or figures are supportive and descriptive of the present teachings, but the scope of the present teachings is defined solely by the claims. While some of the best modes and other embodiments for carrying out the present teachings have been described in detail, various alternative designs and embodiments exist for practicing the present teachings defined in the claims.

What is claimed is:

1. A deformable fastening system comprising:

a clamped component; and a fastener including a bolt having a shaft portion extending along a longitudinal axis of the fastener, the shaft portion including a securing portion formed thereon, and a head portion having a surface including at least one engagement portion, wherein the shaft portion of the bolt is inserted through a passage in the clamped component to engage a corresponding thread on a nut member and the head portion of the bolt is rotated to move the bolt into the nut member during a tightening cycle, wherein the at least one engagement portion includes one or more projections formed on the surface of the head portion generally proximate the shaft portion and in arrangement with the longitudinal axis and shaft portion, wherein the one or more projections includes at least one first projection extending generally circumferentially about the surface of the head portion relative to the longitudinal axis and one or more second projections extend generally circumferentially about the surface of the head portion relative to the longitudinal axis, wherein the at least one first projection is formed with at least one geometric profile with multiple arcuate shaped engagement surfaces as part of the surface of the head portion to provide a sealing arrangement between the fastener and a mating surface of the clamped component, wherein the one or more second projections are disposed radially inward from the at least one first projection and are formed with at least one geometric profile to provide a grounding arrangement with the mating surface of the clamped component, wherein the one or more projections formed on the at least one engagement portion of the surface of the head of the bolt engage the mating surface of the clamped component when the bolt is moved into the nut member causing an increase in axial load during the tightening cycle to deform the clamped component.

2. The deformable fastening system of claim 1, wherein the at least one first projection comprises a sealing ring extending continuously circumferentially about the surface of the head portion relative to the longitudinal axis.

3. The deformable fastening system of claim 1, wherein the multiple arcuate shaped engagement surfaces engage the clamped component at various depths to provide a sealing arrangement between the fastener and the mating surface of the clamped component.

4. The deformable fastening system of claim 3, wherein the multiple arcuate shaped engagement surfaces are formed on the at least one first projection in offset positions to provide distinct engagement depths to provide a sealing arrangement between the fastener and the mating surface of the clamped component.

5. The deformable fastening system of claim 1, wherein the one or more second projections are formed with at least one geometric profile as part of the surface of the head portion of the fastener to form a grounding ring.

6. The deformable fastening system of claim 5, wherein the at least one geometric profile of the one or more second projections is formed with an arcuate shaped profile as part of the surface of the head portion of the fastener to form the grounding ring.

7. The deformable fastening system of claim 1, wherein the one or more second projections are formed as a plurality of discrete members cooperatively arranged to extend circumferentially around the surface of the head portion to provide continuous plurality of lines of contact between the one or more projections and the mating surface of the clamped component.

8. The deformable fastening system of claim 1, wherein the at least one first projection is a sealing ring, and the one or more second projections form a grounding ring disposed radially inward from the at least one first projection relative to the longitudinal axis.

9. The deformable fastening system of claim 1, wherein the one or more projections of the at least one engagement portion are formed as one or more rings extending circumferentially around the surface of the head portion in a substantially circular and concentric arrangement with the longitudinal axis.

10. A fastener comprising:

a bolt having a head portion and a shaft portion extending along a longitudinal axis of the fastener, the shaft portion including a securing portion formed thereon; and at least one engagement portion formed on a surface of the head portion, wherein the at least one engagement portion includes one or more projections formed on the surface of the head portion generally proximate the shaft portion and in arrangement with the longitudinal axis and shaft portion, wherein the one or more projections includes at least one first projection extending generally circumferentially about the surface of the head portion relative to the longitudinal axis, wherein the at least one first projection is formed with multiple arcuate shaped engagement surfaces as part of the surface of the head portion, wherein the multiple arcuate shaped engagement surfaces are formed on the at least one first projection in offset positions to engage a clamped component at various distinct engagement depths to provide a sealing arrangement between the fastener and the clamped component.

11. The fastener of claim 10, wherein at least one of the multiple arcuate shaped engagement surfaces is formed at an increased height relative to at least one other of the multiple arcuate shaped engagement surfaces to engage the clamped component at various depths to provide the sealing arrangement between the fastener and the clamped component.

12. The fastener of claim 11, wherein the multiple arcuate shaped engagement surfaces formed in the offset positions provide a sealing arrangement between the fastener and the clamped component.

13. The fastener of claim 10, wherein the one or more projections of the at least one engagement portion of the head portion of the fastener includes one or more second projections extending generally circumferentially about the surface of the head portion relative to the longitudinal axis.

14. The fastener of claim 13, wherein the one or more second projections are formed with at least one geometric profile as part of the surface of the head portion of the fastener to form a grounding ring.

15. The fastener of claim 14, wherein the at least one geometric profile of the one or more second projections is formed with an arcuate shaped profile as part of the surface of the head portion of the fastener to form the grounding ring.

16. The fastener of claim 13, wherein the one or more second projections are formed as a plurality of discrete members cooperatively arranged to extend circumferentially around the surface of the head portion to provide a continuous engagement with the clamped component.

17. The fastener of claim 10, wherein the at least one first projection is a sealing ring, and the one or more second projections form a grounding ring disposed radially inward from the at least one first projection relative to the longitudinal axis.

18. The fastener of claim 10, wherein the one or more projections of the at least one engagement portion are formed as one or more rings extending circumferentially around the surface of the head portion in a substantially circular and concentric arrangement with the longitudinal axis.

19. A fastener comprising:

a bolt having a head portion and a shaft portion extending along a longitudinal axis of the fastener, the shaft portion including a securing portion formed thereon; and at least one engagement portion formed on a surface of the head portion, wherein the at least one engagement portion includes one or more projections formed on the surface of the head portion generally proximate the shaft portion and in arrangement with the longitudinal axis and shaft portion, wherein the one or more projections includes, at least one first projection extending generally circumferentially about the surface of the head portion relative to the longitudinal axis, wherein the at least one first projection is formed with multiple arcuate shaped engagement surfaces as part of the surface of the head portion, wherein the multiple arcuate shaped engagement surfaces are formed on the at least one first projection in offset positions to engage a clamped component at various distinct engagement depths to provide a sealing arrangement between the fastener and the clamped component, and one or more second projections extending generally circumferentially about the surface of the head portion relative to the longitudinal axis, the one or more second projections are formed as a plurality of discrete members cooperatively arranged to extend circumferentially around the surface of the head portion to provide a continuous engagement with the clamped component.

20. The fastener of claim 19, wherein at least one of the multiple arcuate shaped engagement surfaces is formed at an increased height relative to at least one other of the multiple arcuate shaped engagement surfaces to engage the clamped component at various depths to provide the sealing arrangement between the fastener and the clamped component.

21. The fastener of claim 20, wherein the multiple arcuate shaped engagement surfaces formed in the offset positions to provide a first sealing arrangement and a second sealing arrangement between the fastener and the clamped component.

22. The fastener of claim 19, wherein the at least one first projection is a sealing ring, and the one or more second projections form a grounding ring disposed radially inward or radially outward from the at least one first projection relative to the longitudinal axis.

* * * * *